(12) United States Patent
Patterson

(10) Patent No.: US 7,677,266 B2
(45) Date of Patent: Mar. 16, 2010

(54) COMPACT MANIFOLDED FAIL SAFE HYDRAULIC CONTROL SYSTEM

(76) Inventor: Andrew John Patterson, 9236—91st Street, Edmonton, Alberta (CA) T6C 3N8

( * ) Notice: Subject to any disclaimer, the term of this patent is extended or adjusted under 35 U.S.C. 154(b) by 509 days.

(21) Appl. No.: 11/601,222

(22) Filed: Nov. 17, 2006

(65) Prior Publication Data

US 2007/0113899 A1    May 24, 2007

(30) Foreign Application Priority Data

Nov. 18, 2005    (CA)    ..................................... 2535326

(51) Int. Cl.
*F16K 17/00*    (2006.01)
(52) U.S. Cl. ...................... 137/458; 60/468; 137/454.6; 137/505.11; 137/505.42
(58) Field of Classification Search ................. 137/458, 137/505.11, 505.42, 454.6; 138/31; 60/468, 60/494
See application file for complete search history.

(56) References Cited

U.S. PATENT DOCUMENTS

| | | | | |
|---|---|---|---|---|
| 2,768,643 A | * | 10/1956 | Acomb | 137/505.42 |
| 3,716,074 A | * | 2/1973 | Peters | 137/625.6 |
| 3,757,815 A | * | 9/1973 | Orr | 137/475 |
| 3,863,672 A | * | 2/1975 | Theriot et al. | 137/596.18 |
| 4,936,339 A | * | 6/1990 | Bennett | 137/454.6 |
| 5,070,900 A | | 12/1991 | Johnson | |
| 5,213,133 A | | 5/1993 | Ellett | |
| 5,291,918 A | | 3/1994 | Johnson | |
| 5,341,837 A | * | 8/1994 | Johnson | 137/458 |
| 6,155,290 A | * | 12/2000 | Nakajima et al. | 137/505.41 |
| 6,390,133 B1 | * | 5/2002 | Patterson et al. | 138/31 |
| 2005/0274418 A1 | * | 12/2005 | Chen | 137/505.42 |

FOREIGN PATENT DOCUMENTS

CA    2266806    9/2000

* cited by examiner

*Primary Examiner*—Stephen Hepperle
(74) *Attorney, Agent, or Firm*—Gable & Gotwals

(57) ABSTRACT

A manifolded fail-safe hydraulic control system provides fail-safe operation of a pipeline valve using no more than a total of 45 proprietary parts in the system. The system controls the operation of a spring return actuator, which in turn strokes the pipeline valve from the normal operating position to the fail-safe position, or from the fail-safe position to the normal operating position. The system enables the valve to automatically stroke to its fail-safe position without external power.

22 Claims, 26 Drawing Sheets

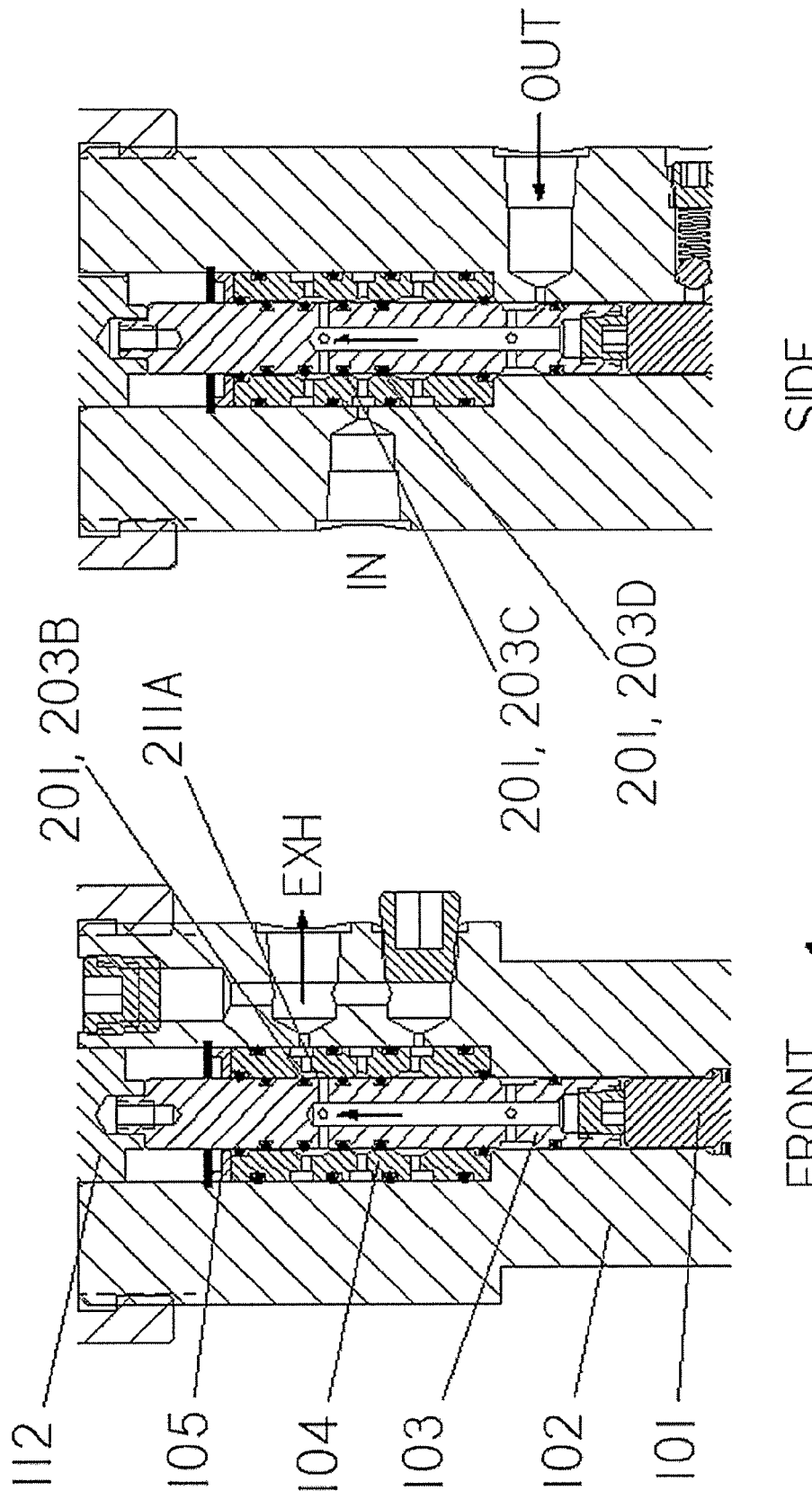

COMPACT MANIFOLDED FAIL SAFE HYDRAULIC CONTROL SYSTEM

CROSS-REFERENCE TO PRIOR APPLICATIONS

This application claims benefit to Canadian Patent Application No. 2,535,326, filed Nov. 18, 2005 and entitled "Compact Manifolded Fail Safe Hydraulic Control System".

FIELD OF THE INVENTION

The present invention relates to the automation of pipeline valves used in critical fail-open or fail-close applications.

BACKGROUND OF THE INVENTION

Currently there are existing self contained emergency shut down systems sold by Emerson Process Management (No known patent, Bettis service manual # I-0019 Rev 4 and Bettis catalog # 45.00), Wood Group (U.S. Pat. No. 5,291,918 and U.S. Pat. No. 5,070,900 and U.S. Pat. No. 5,213,133), Stream-Flo Industries (No known patent, Steam-Flo catalog # 05/03) and Argus Machine Company (CD Patent 2,266,806, Argus catalog # 5000-1-3000-01/02). All of these systems are designed to control the emergency shut down closure of valves on oil and gas wellheads. Typically these systems are designed with a significantly larger number of proprietary components. A larger total number of proprietary components used in the cited emergency shut down systems leads to unreliability.

BRIEF SUMMARY OF THE INVENTION

The Previously Presented Manifolded Fail Safe Hydraulic Control System provides an incremental improvement in reliability due to its simple reliable design configuration. It is ideal for controlling critical fail-open and fail-close pipeline valves. Critical applications require that the pipeline valve does stroke to the fail-safe position without the need for an external power source. Fail-open applications include fire protection, pressure relief, process balance. Incorporating a compact oil immersed hydraulic power pack within the reservoir provides an incremental improvement in operating convenience.

The simple and compact Manifolded Fail Safe Hydraulic Control System represents a Previously Presented and useful improvement to the typical hydraulic ESD system which are currently being sold. Its superior reliability and compact size make it ideal for critical applications other than oil and gas wellheads. Instead of the typical arrangement where each control device is assembled in its own pressurized body, control devices are assembled into one common pressurized manifold. Total number of proprietary parts compared to existing emergency shutdown systems is minimized to increase reliability.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 24 is a cross section pressure pilot 3-way spool and sleeve at high sensed pressure position.

DETAILED DESCRIPTION OF THE PREFERRED EMBODIMENT(S)

The compact manifolded hydraulic fail safe control system is used to control the operation of a spring return actuator which in turn strokes the pipeline valve from the normal operating position to the fail safe position, or from the fail safe position to the normal operating position. The 2-way dump valve opens to circulate the spring return actuator's cylinder volume to the reservoir. The pipeline valve will automatically stroke to the required fail-safe position without an external power source. Pipeline valves operated with quarterturn or linear type spring return actuators can be operated using the manifolded hydraulic fail safe control system. The 2-way dump valve is opened when the regulated signal pressure is removed. The manifolded hydraulic fail safe control system incorporates a regulated signal pressure circuit and a pressure circuit maintained at the actuator operating pressure.

The regulated signal pressure to the 2-way dump valve is removed when pipeline pressure exceeds the 3-way pressure pilot's high or low set-point. Likewise the 2-way dump valve regulated signal pressure is removed when the 3-way S.C.A.D.A. (electric solenoid) valve receives a signal. When the 2-way dump valve is opened the spring return actuator cylinder volume is circulated to the reservoir across the regulator (pressure regulated cylinder dump) or across a diffuser (high-pressure cylinder dump).

High pressure and low-pressure relief valves are used to limit system pressure upstream and downstream of the regulator. A low-pressure accumulator is provided to accommodate ambient temperature fluctuations.

The hydraulic fail-safe control system can be reset, or "re-charged", by hand pumping in order to refill the spring return actuator cylinder volume and return the pipeline valve to its normal operating position. The 2-way dump valve's lever is first rotated to the horizontal plane; from the vertical plane. Then the manual hand pump is cycled until the spring return actuator and pipeline valve have returned to their normal operating positions. Alternatively an electrically powered pump enclosed in the reservoir can also be used to reset the system.

The system is reset when the 2-way dump valve's latch lever automatically repositions itself in the vertical plane and the line valve is in the normal operating position. When reset the system is able to monitor pipeline pressure and process conditions. The pipeline valve's fail-safe valve position can be achieved manually by applying axial hand force to the 2-way dump valve lever. This hand force acts against 2-way dump valve internal pressure to manually open the dump valve.

All of the fail-safe hydraulic control system proprietary components are assembled and/or installed into a single pressurized manifold.

Figure 1:
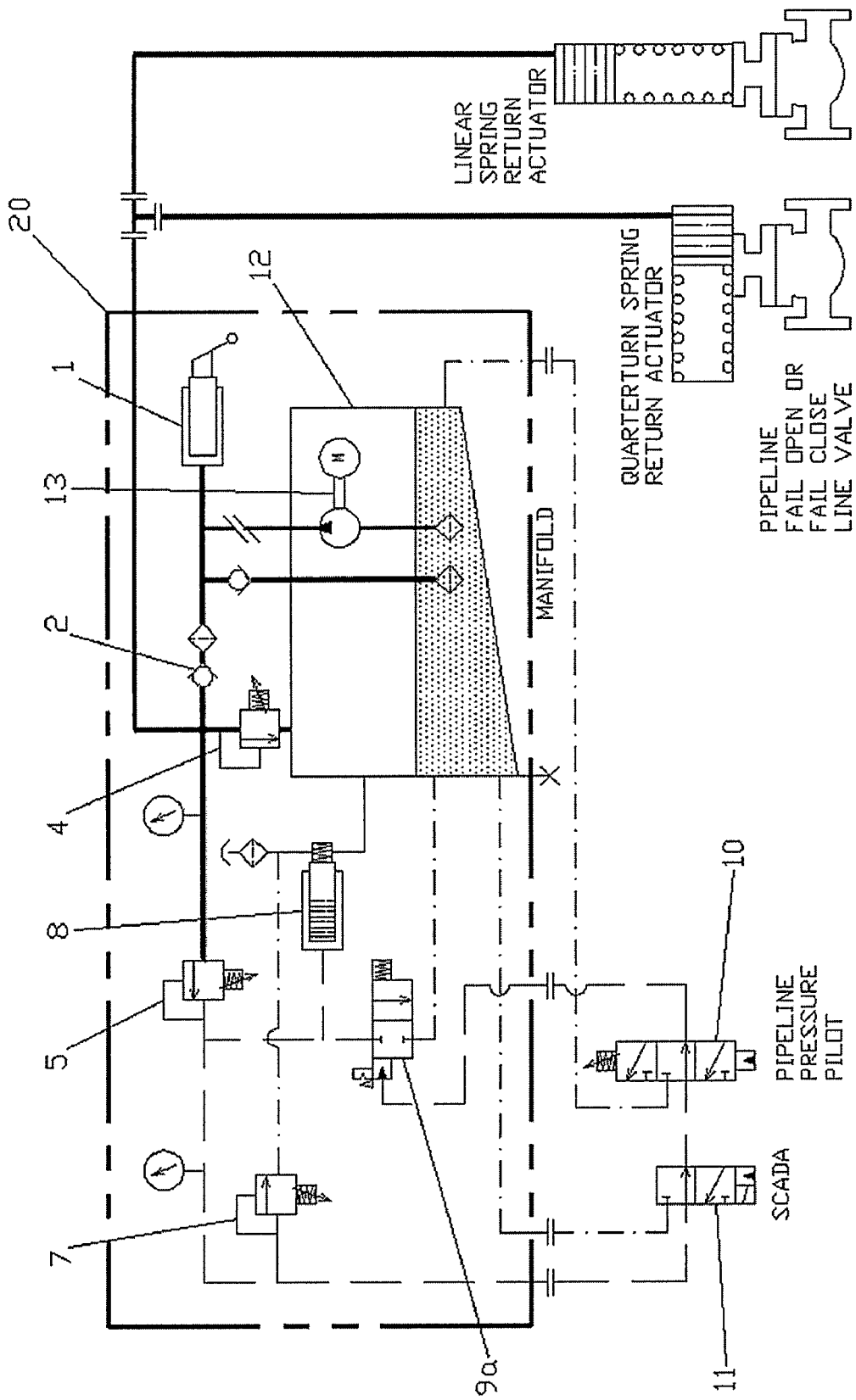
FIG. 1 is a schematic drawing of the hydraulic fail safe control system with the 2-way regulated dump valve.

Turning now to the drawings wherein like reference characters indicate like or similar parts throughout, FIG. 1 illustrates a closed hydraulic circuit to control the operation of a fail safe pipeline valve. The hydraulic circuit consists of two loops. The first loop is connected to the spring return actuator cylinder volume and is at high pressure. The second loop is at low pressure and is connected to the first loop across the low pressure regulator 5. The low pressure regulator 5 supplies the low pressure accumulator 8 with a volume of low pressure hydraulic fluid from the first loop. The low pressure relief valve 7, regulated 2-way dump valve 9a, 3-way SCADA (electric solenoid valve 11 and 3-way pressure pilot 10 are part of the second loop and recirculate return hydraulic fluid back to the reservoir 12. The spring volume of low pressure accumulator 8 is connected to the return lines and the reservoir 12 fill port. There is a hand pump 1, filter and check valve module 2 and high pressure relief valve 4 on the first loop. Hand pump 1 may be replaced by an electric pump 13.

Referring to FIG. 1 the outline of the manifold 20 is shown to illustrate that the hand pump 1, low pressure regulator 5, low pressure accumulator 8, low pressure relief valve 7, high pressure relief valve 4 and the regulated 2-way dump valve 9a are assembled within the single one piece manifold 20.

Figure 2:
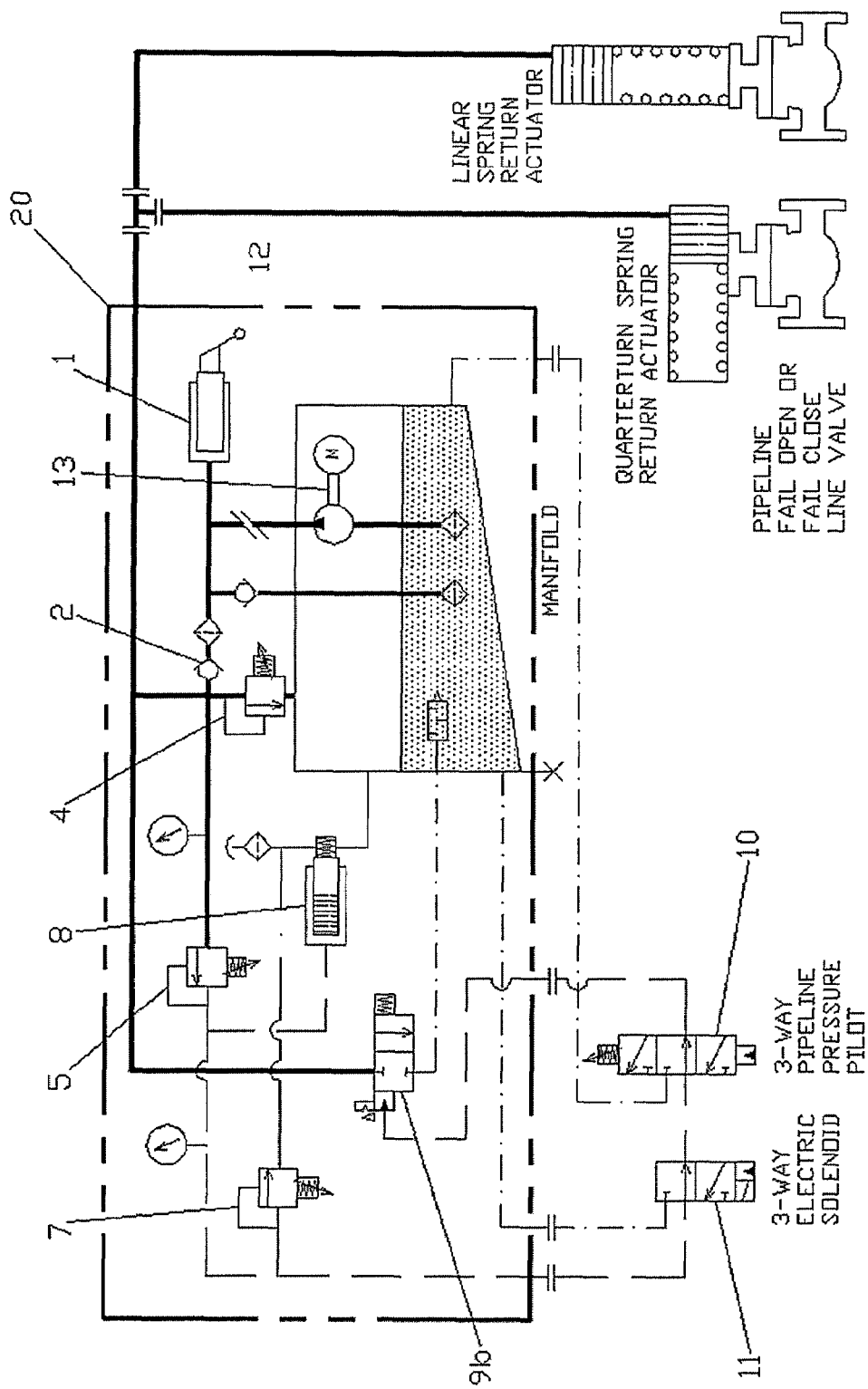
FIG. 2 is a schematic drawing of the hydraulic fail safe control system with the 2-way high pressure dump valve.

Referring to FIG. 2 there is shown another version of the closed hydraulic circuit. In the second hydraulic circuit shown in FIG. 2 the high pressure 2-way dump valve 9b connects to the first high pressure loop. In FIG. 1 the spring return actuator cylinder volume is regulated to low pressure before it is dumped to the reservoir 12. In FIG. 2 the spring return actuator cylinder volume is dumped directly to the reservoir 12 through a diffuser.

Figure 3A:
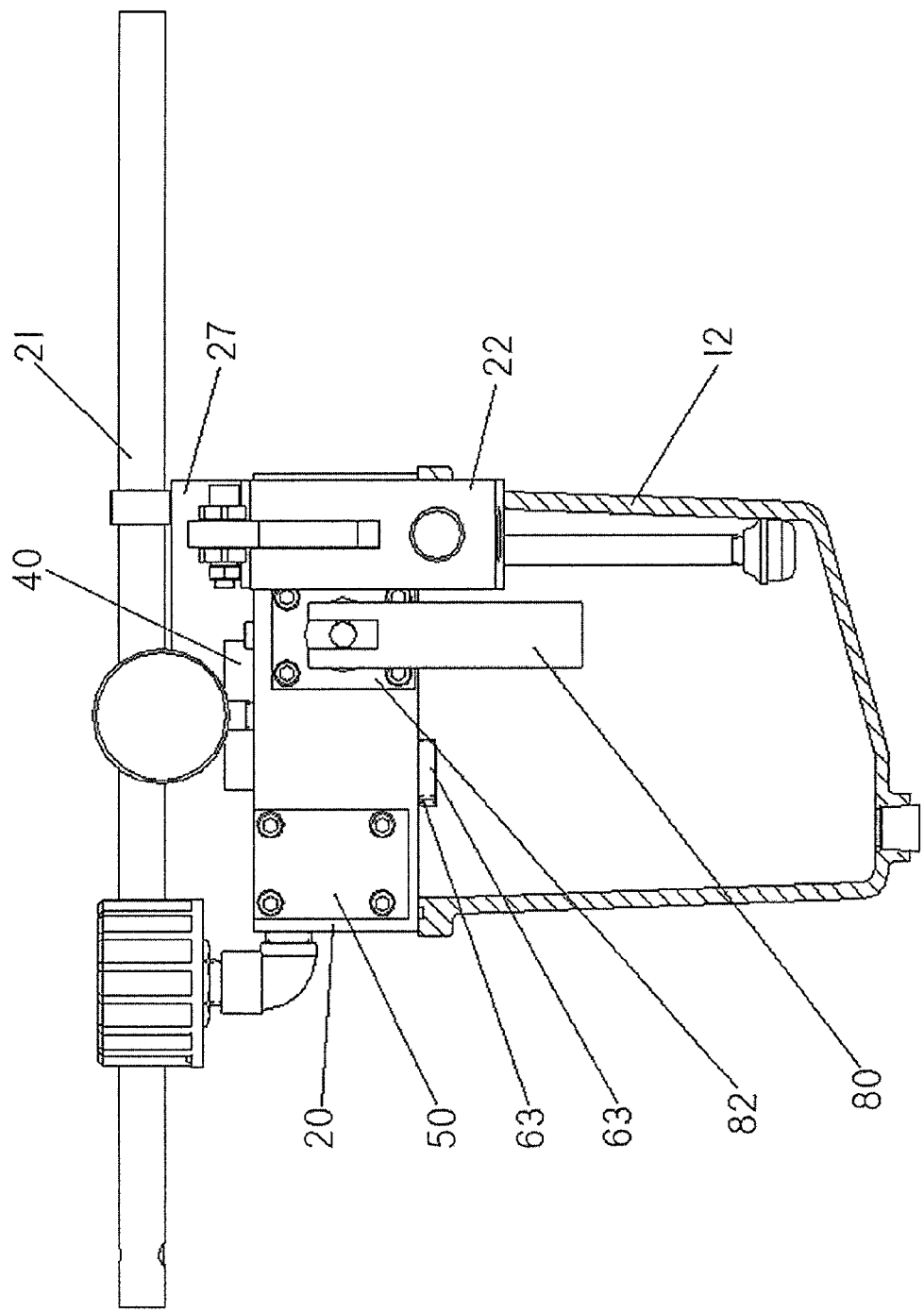
FIGS. 3A to 3C are outline drawing views of the manifolded fail safe hydraulic control system.
Figure 3B:
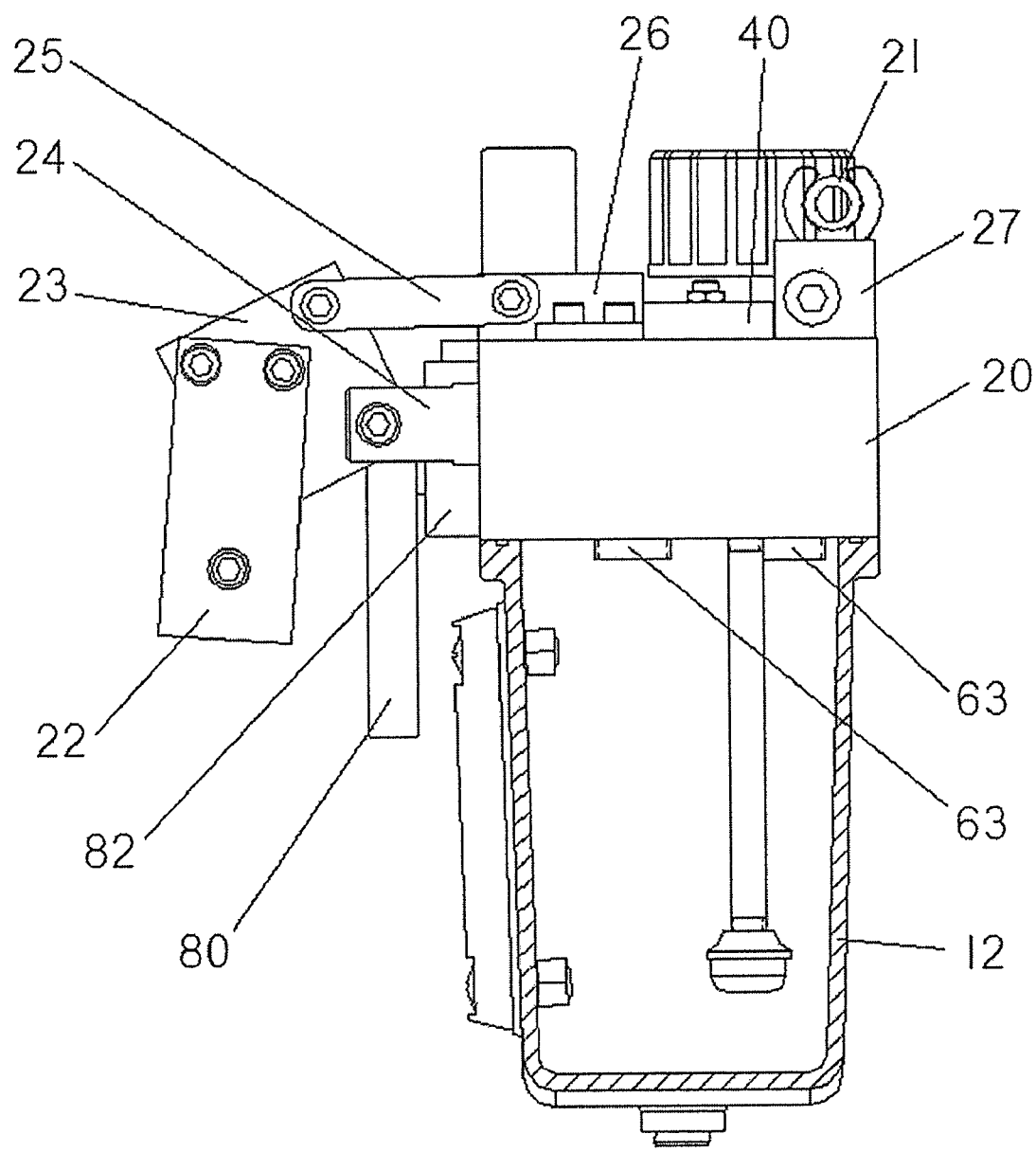
Figure 3C:
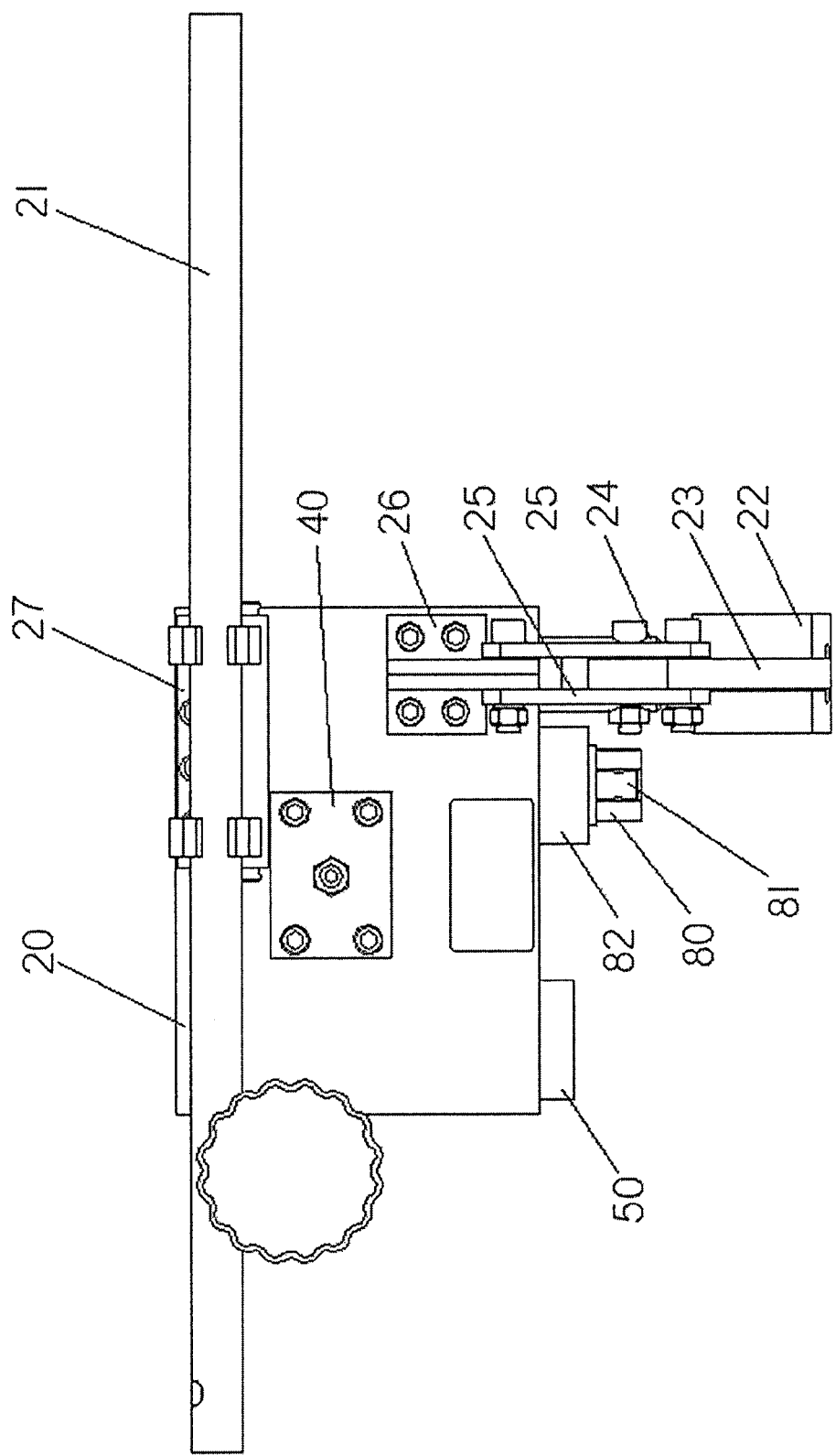
Figure 4:
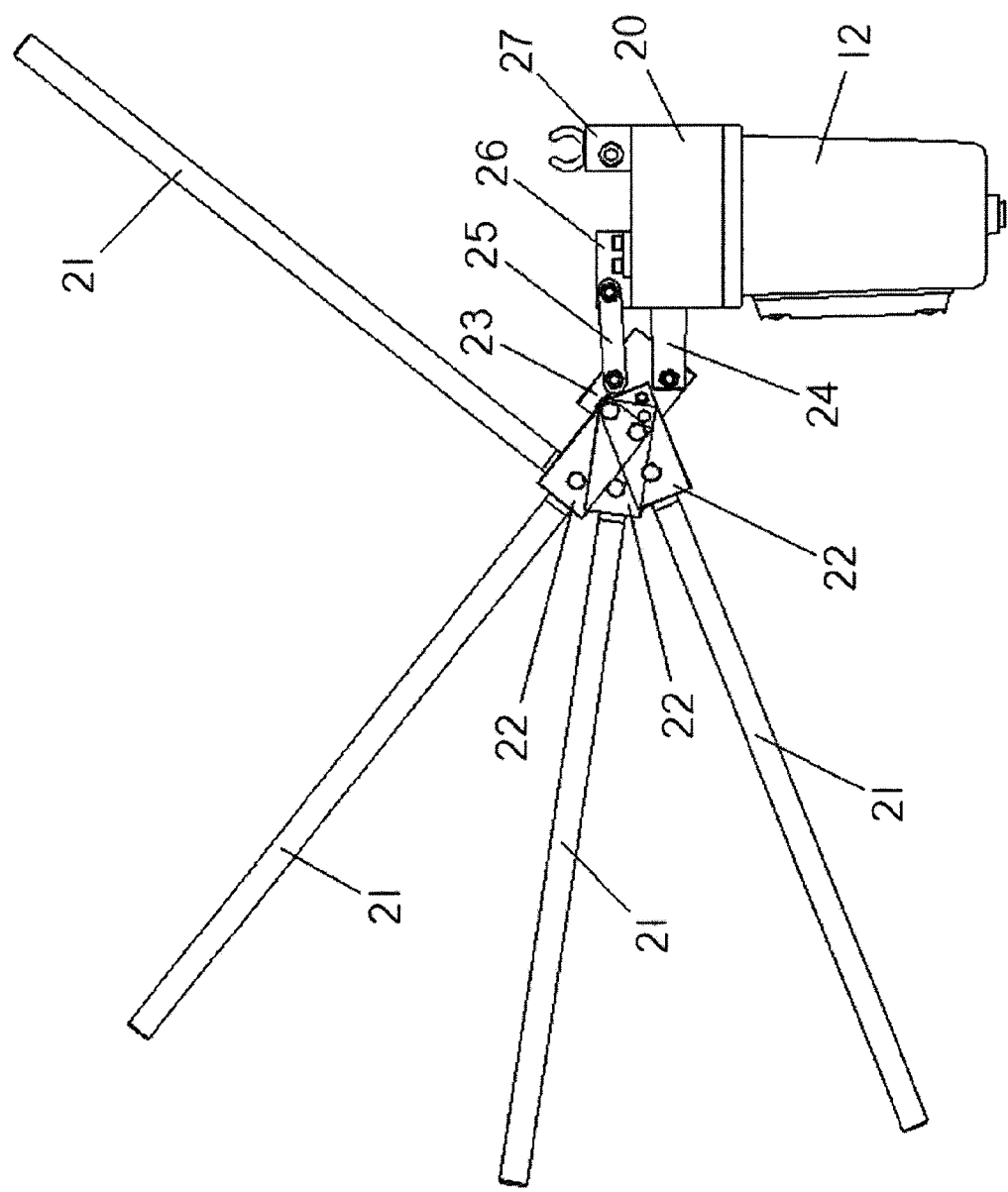
FIG. 4 is an outline drawing of the hand pump lever.
Figure 5:
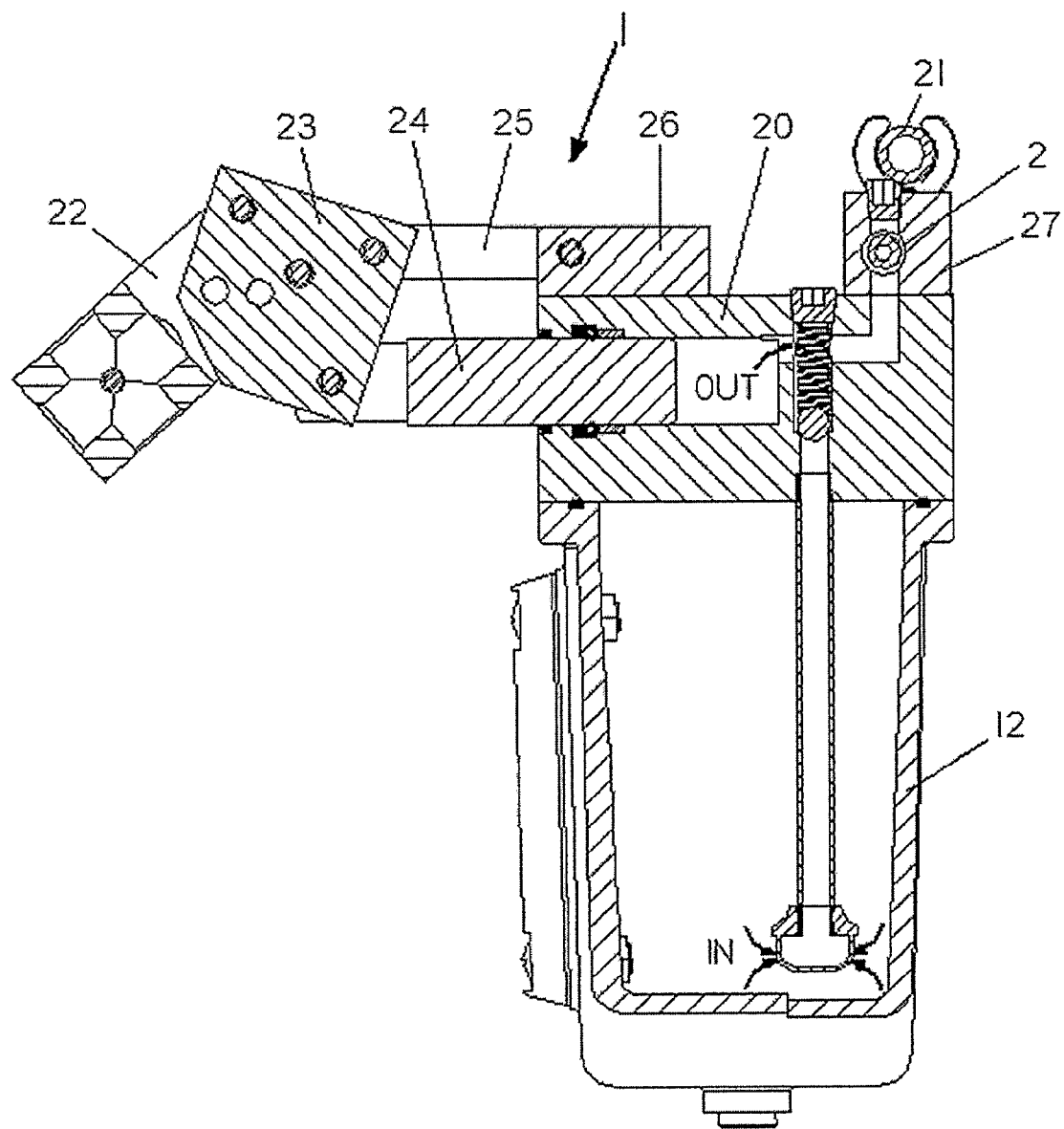
FIG. 5 is a cross section drawing of the hand pump and reservoir.

Referring to FIGS. 3 to 5 there is shown a top view, front view and side view of the compact manifolded hydraulic fail safe control system. The reservoir 12 is sectioned in the front and side views. The rectangular profile of reservoir 12 matches the profile of the manifold 20 thereby maximizing the useful volume in the reservoir 12. The front profile of the reservoir 12 shows the sloped bottom provided to collect solid debris adjacent to the drain port and away from the inlet screen of hand pump 1.

Referring to FIG. 4 there is shown in profile a side view of the compact manifolded hydraulic fail safe control system with hand pump handle 21 placed in the hand pump lever 22. In order to cycle the hand pump 1, the handle 21 is placed into the lever 22. Three operating positions are provided for the lever 22. The lever 22 pivots about a bolt engaged in the lever plate 23. A second bolt in the lever 22 engages the circular bolt pattern in the lever plate 23 which includes three holes equally spaced at sixty-degrees inclusive.

Referring to FIG. 5 there is shown a cross section drawing of the hand pump 1 which is assembled into the manifold 20 using an additional nine proprietary parts. The piston 24 cycles in the horizontal plane. In order to reduce operating friction and minimize eccentric loading of the seals the piston 24 cycles within a standard plastic bushing. The lever 22 has two holes which intersect at 90 degrees and are provided to accept the handle 21. The handle 21 is bolted to the lever 22 in a bolt hole located at this intersection. This said 90 degrees combined with 60 degrees of rotary adjustment referenced in FIG. 4 results in handle 21 having 150 degrees of total handle adjustment. The module 27 contains the hand pump discharge filter and check valve 2 referenced in FIG. 1. The module 27 assembly complete with said discharge filter and check valve 2 can be removed and replaced as a cartridge. The module 27 assembly includes an elevated pipe plug in order to provide an effective method of venting entrained air from the compact manifolded hydraulic fail safe control system. When the link 25 is loaded in tension there are no resulting bending stresses only simple tension stresses and contact stresses. Bracket 26 is bolted to manifold 20.

Figure 6:
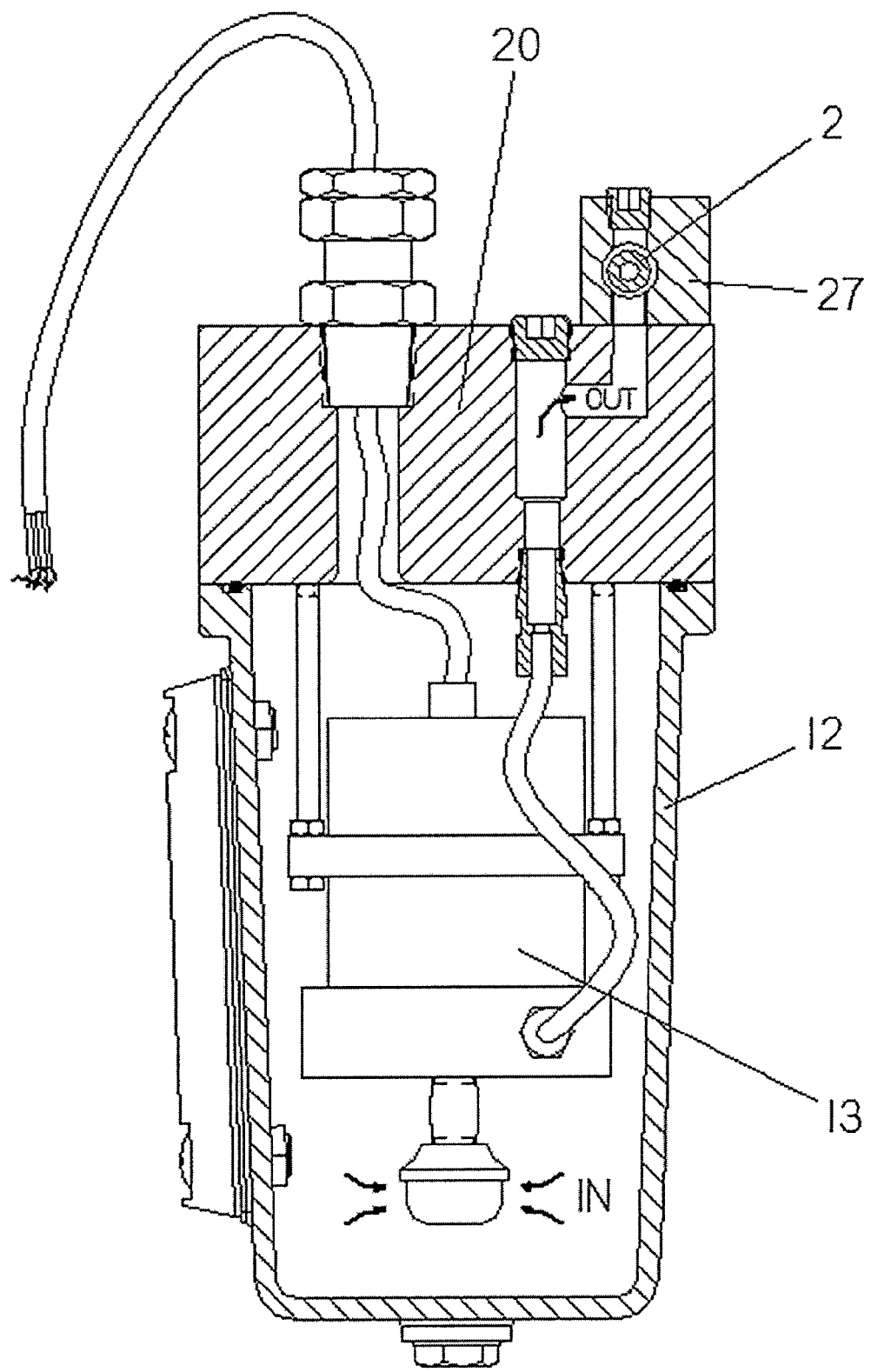
FIG. 6 is a cross section drawing of the reservoir with oil immersed hydraulic power supply.

Referring to FIG. 6 there is shown in profile a side view of the compact oil immersed hydraulic power supply (electric pump) 13. The compact oil immersed hydraulic power supply 13 replaces the manual hand pump and is enclosed within the reservoir 12 and manifold 20. When oil immersed electric pump 13 is re-energized, fluid flows from fully contained reservoir 12 into the spring return actuator cylinder volume where it is maintained by check valve 2.

Figure 7:
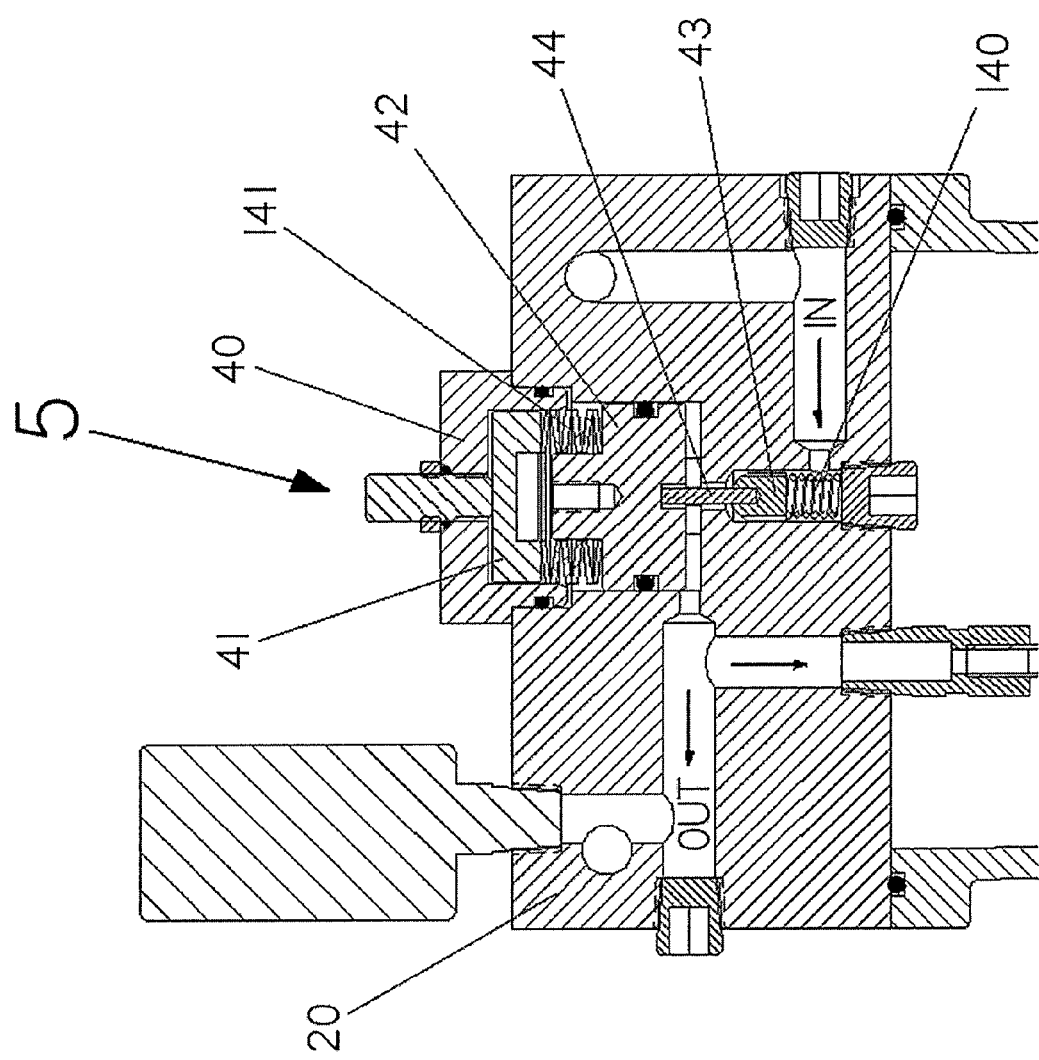
FIG. 7 is a cross section drawing of the manifolded regulator without system pressure.

Referring to FIG. 7 there is shown a cross section drawing of the low pressure regulator 5 which is assembled into the manifold 20 using four additional proprietary parts. The piston 42 and poppet 43 are preferably plastic. The piston 42 has a slot cut across and through the small end which has the pin hole. The poppet 43 has four linear radially profiled slots along its entire axial length. The poppet 43 also has four axial grooves running the entire length and equally spaced around the outside diameter. The plate 41 contains a stack of spring washers. A set screw threads through the cover 40 and is used to adjust spring load when torqued against the plate 41.

Figure 8:
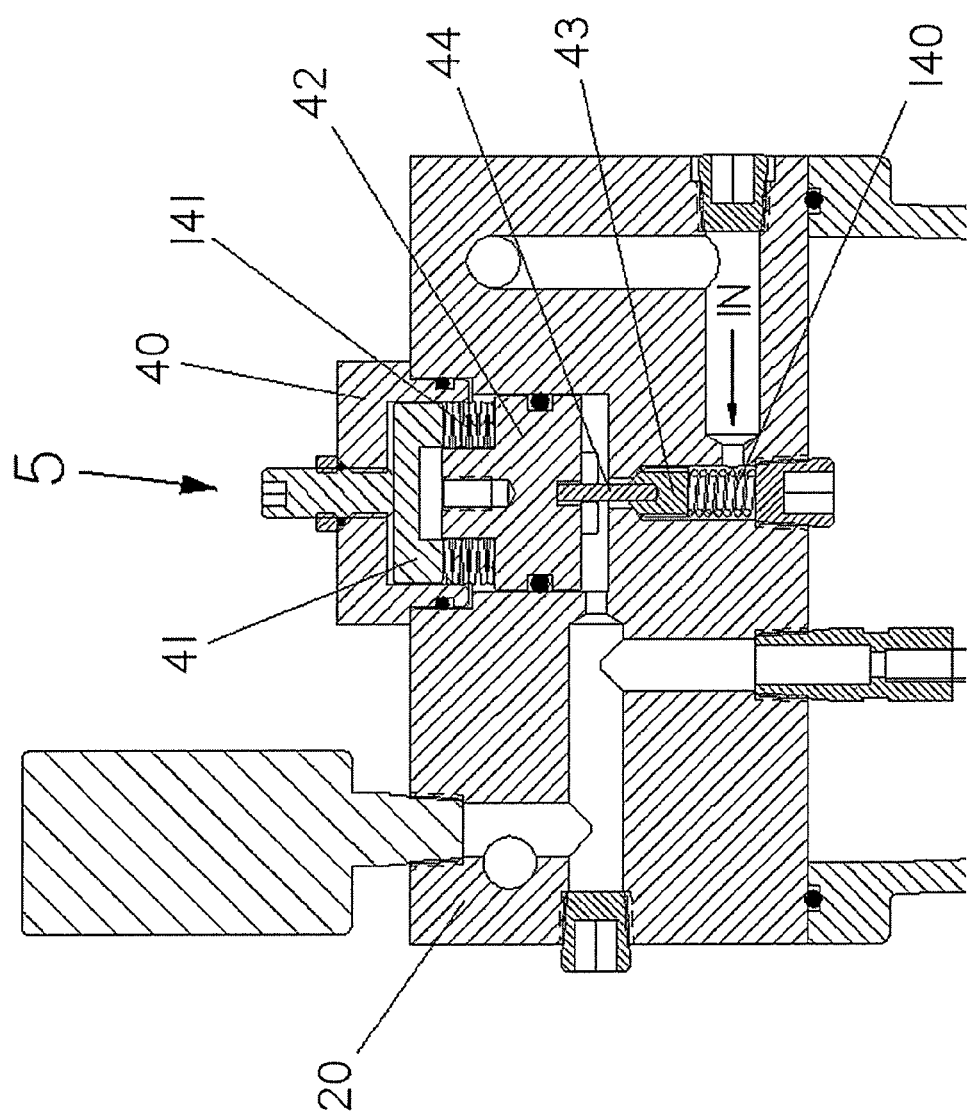
FIG. 8 is a cross section of the manifolded regulator with system pressure.

Referring to FIG. 8, the poppet 43 seals directly against the manifold 20 when it is pressurized in the closed position. The poppet 43 seals against the manifold 20 due to spring load produced by the single coil spring 140. When the piston 42 compresses the stack of spring washers 141 the poppet 43 contacts the mating sealing edge provided in the manifold 20. A spacer pin 44 maintains separation between the poppet 43 and the piston 42. The plastic piston 42 reduces friction forces in the low pressure regulator 5. A tapped hole is provided in the top end of the piston 42 to aid with disassembly.

Figure 9:
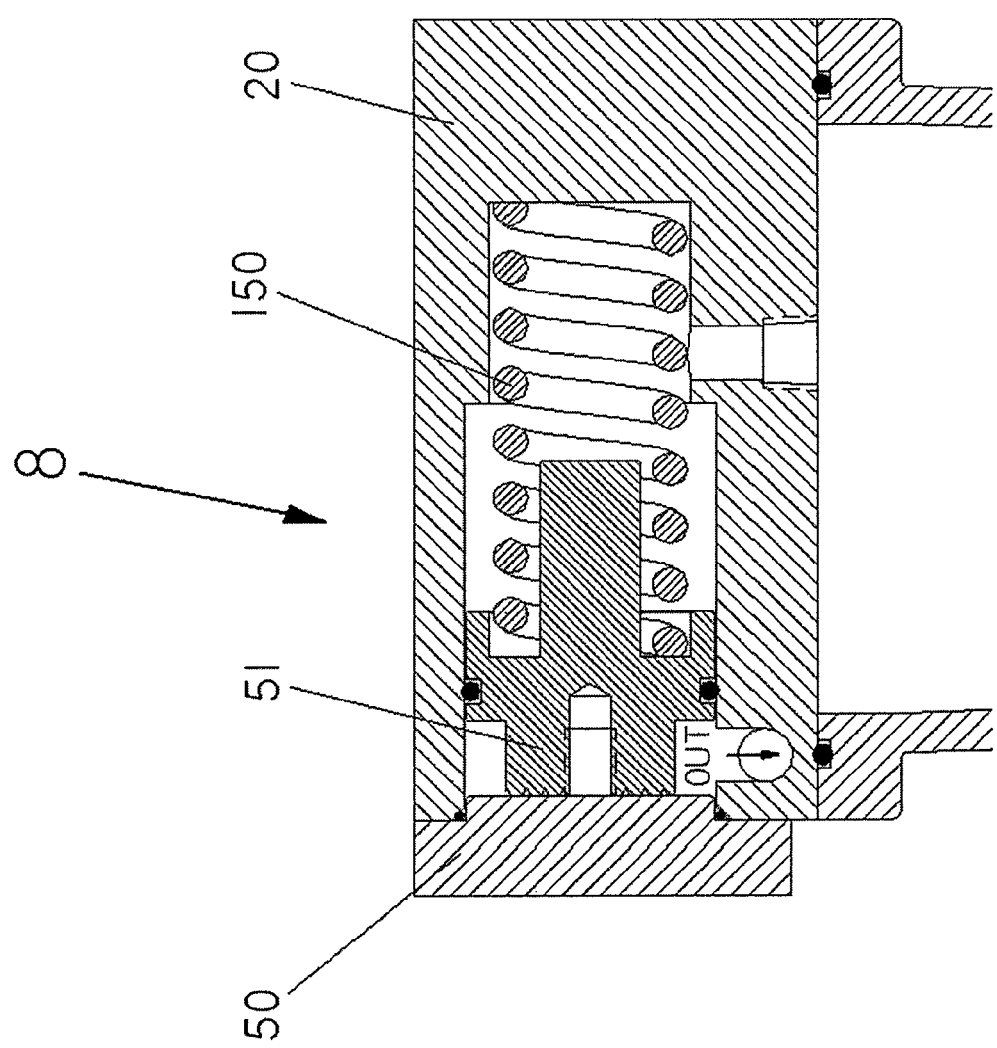
FIG. 9 is a cross section of the manifolded accumulator without system pressure.

Referring to FIG. 9 there is shown a cross section drawing of the low pressure accumulator 8 which is assembled into the manifold 20 using two additional proprietary parts. The cover 50 positions the starting position of piston 51. Piston 51 is preferably made of plastic to reduces friction forces in the low pressure accumulator 8. The piston is loaded by a single coil spring 150. A tapped hole is provided on the front end of the piston 51 to aid disassembly. Piston 51 has extended spring guide diameter 151. A single spiral groove circles the top end of the piston 51 approximately three times to ensure evenly distributed pressure when the piston 51 is in its starting position.

Figure 10:
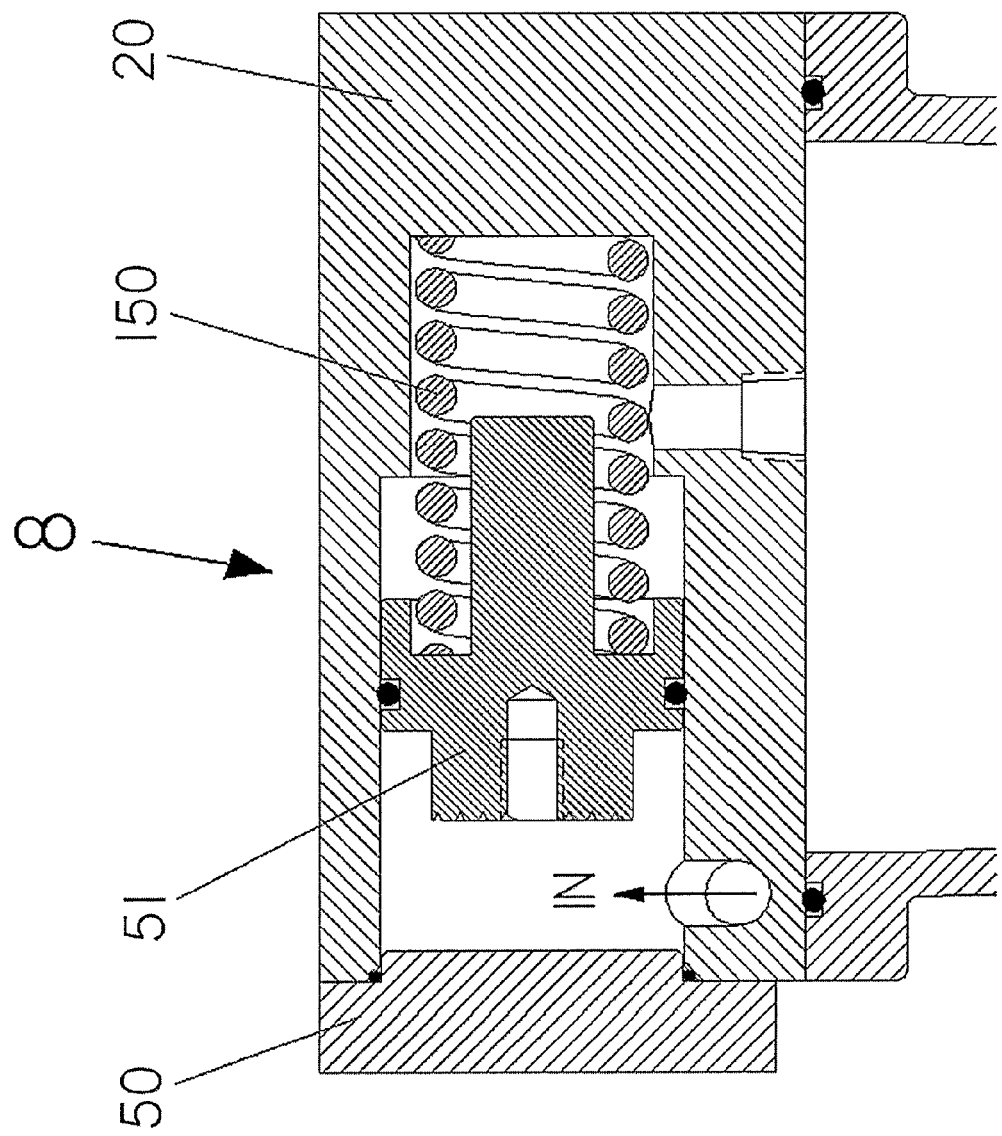
FIG. 10 is a cross section of the manifolded accumulator with system pressure.
Figure 15:
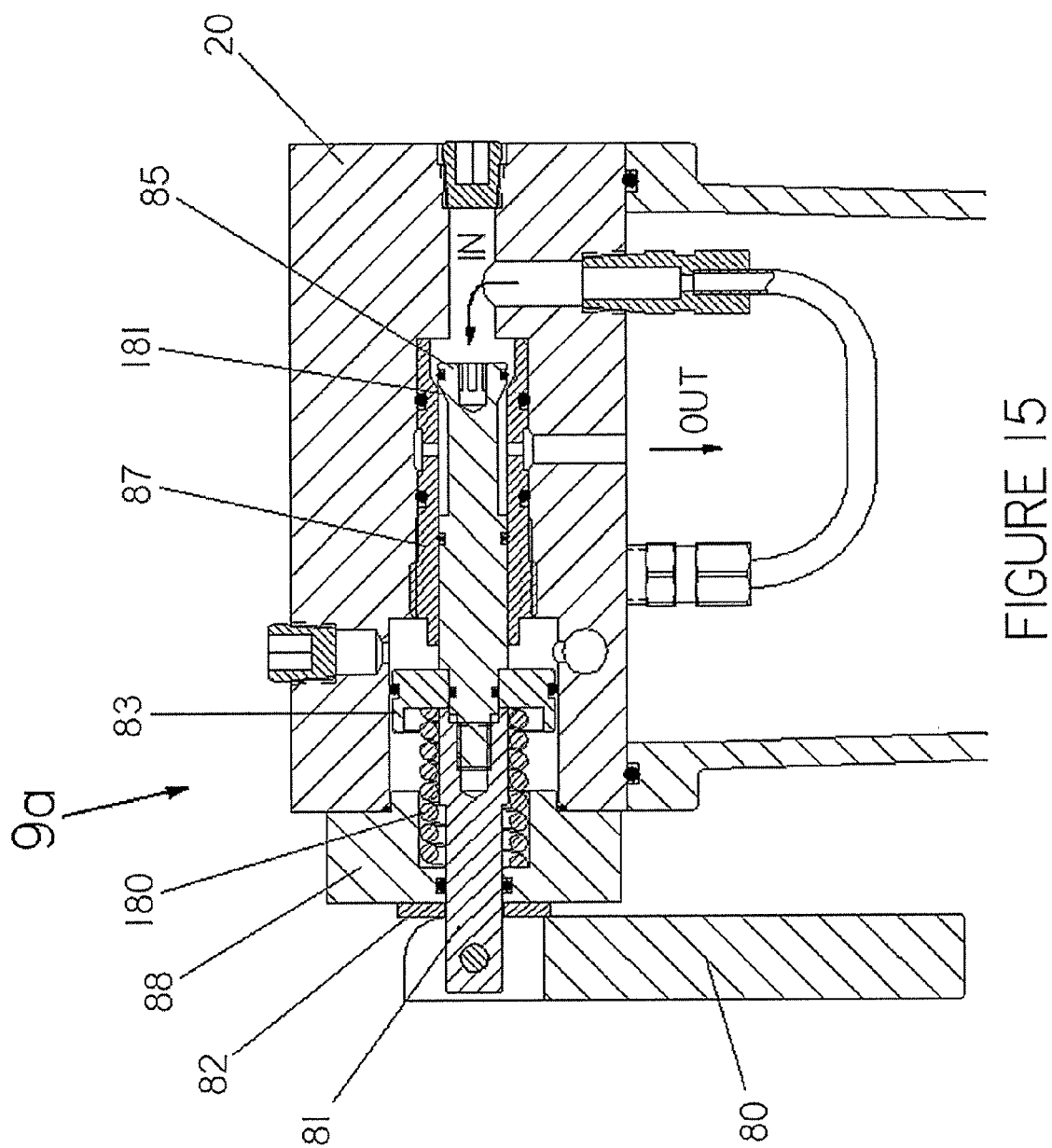
FIG. 15 is a cross section of the manifolded regulated 2-way dump valve in the dumped position.

Referring to FIG. 10 there is shown a cross section drawing of the low pressure accumulator 8 in the pressurized condition. The back end of the piston 51 does not contact the manifold 20 in normal operation. The low pressure accumulator 8 has large capacity which is required for the large displacement generated by the large piston area of the 2-way dump valve 9a as shown in FIG. 15.

Figure 11:
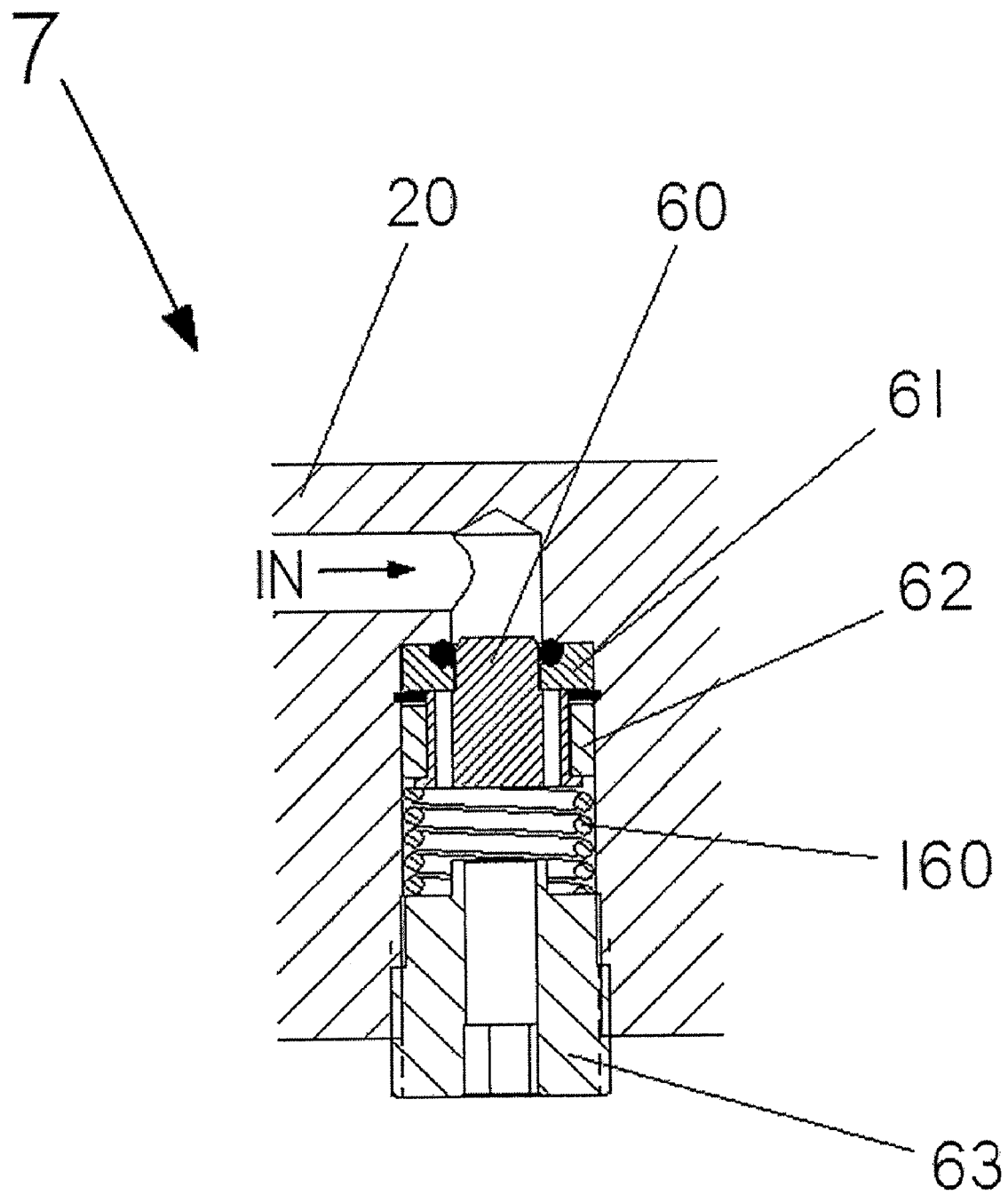
FIG. 11 is a cross section of the manifolded low pressure relief valve without system pressure.

Referring to FIG. 11 there is shown in cross section drawing of the low pressure relief valve 7 which is assembled into the manifold 20 using four additional proprietary parts. The bushing 62 is preferably plastic to reduce friction forces. The seat 61 mates against the manifold 20 to form the poppet seal groove. The seat 61 contains a soft seal and is fixed in position by a retaining ring. The poppet 60 mating surface contacts the mating surface of seat 61. Four holes drilled through and normal to the mating surface of poppet 60 intersect the chamfer provided on the mating surface of seat 61 to form the volume which is common to the reservoir 12. The bushing 62 and cap 63 are provided with a hex hole and is used to adjust spring load on the single coil spring 160. The cap 63 is common to (i.e., shared by) the low pressure and high pressure relief valves 7, 4 shown in FIG. 11 and FIG. 13, respectively.

Figure 12:
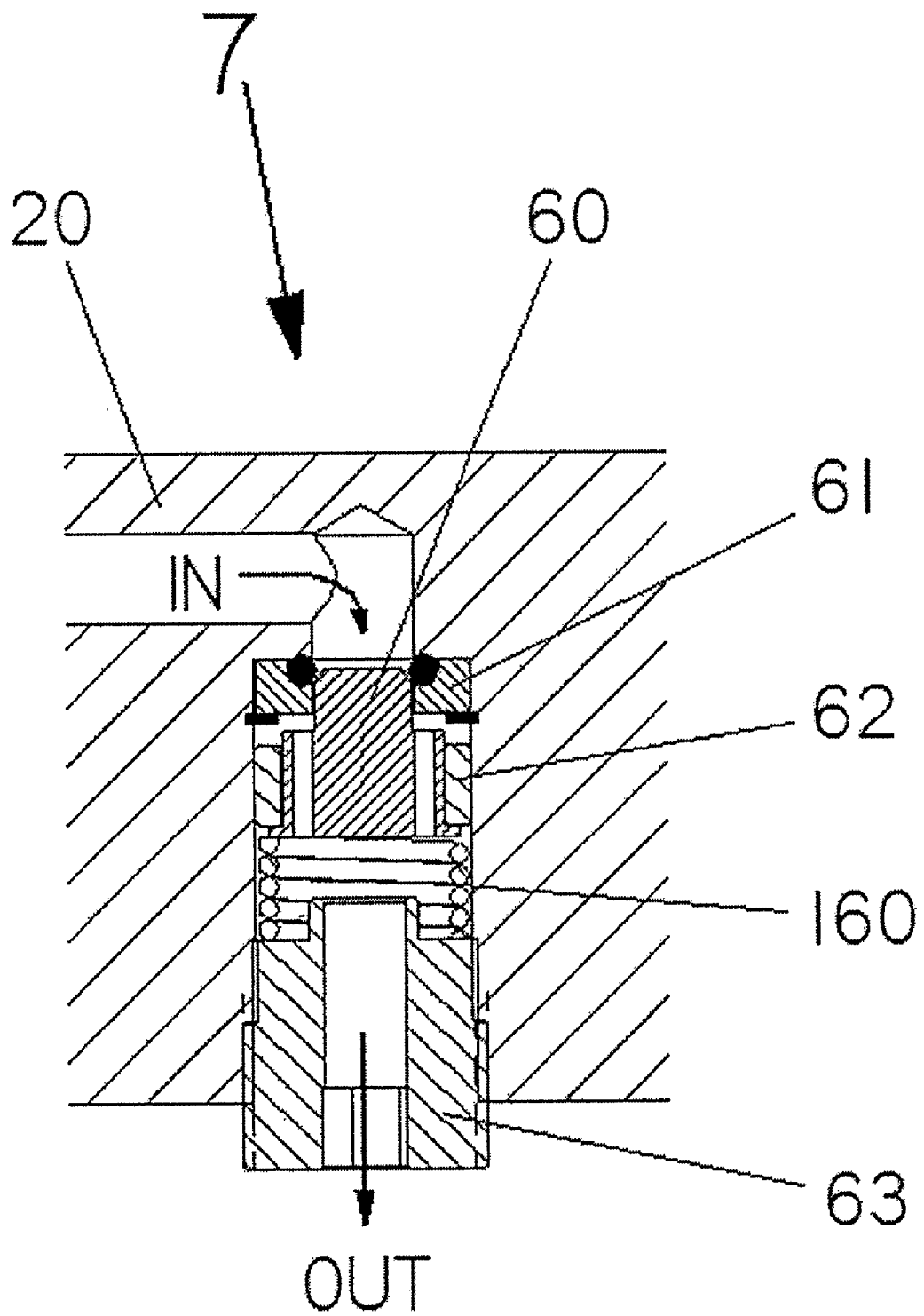
FIG. 12 is a cross section of the manifolded low pressure relief with system pressure.

Referring to FIG. 12 there is shown a cross section drawing of the low pressure relief valve 7 in the pressurized open position. A hole drilled through the cap 63 discharges fluid into the reservoir 12.

Figure 13:
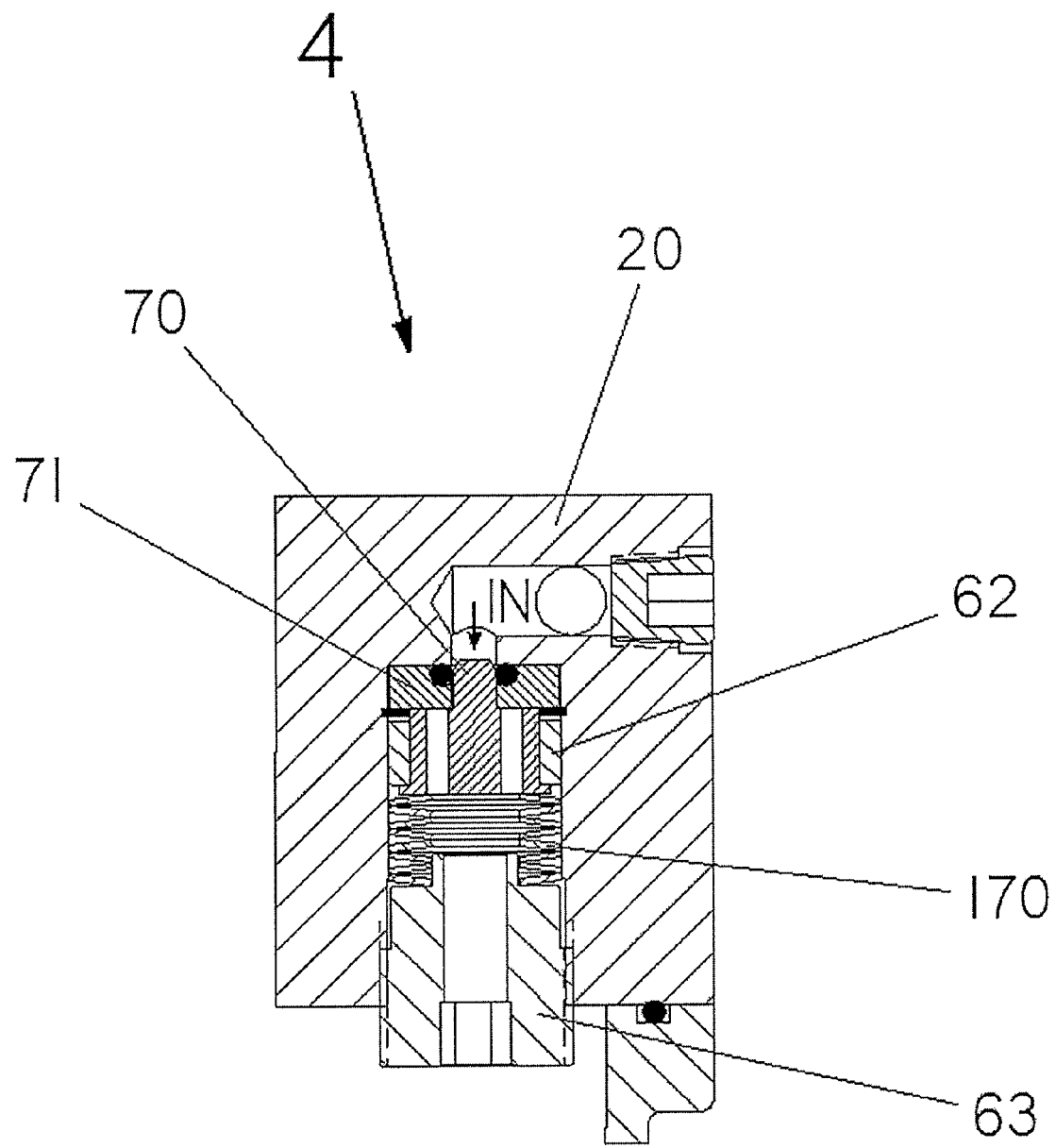
FIG. 13 is a cross section of the manifolded high pressure relief valve without system pressure.

Referring to FIG. 13 there is shown a cross section drawing of the high pressure relief valve 4 which is assembled into the manifold 20 using four additional proprietary parts. The bushing 62 is preferably plastic to reduce friction forces. The seat 71 mates against the manifold 20 to form the poppet seal groove. The seat 71 contains a soft seal and is fixed in position by a retaining ring. The mating surface of poppet 70 contacts the mating surface of seat 7l. Four holes drilled through and normal to the mating surface of poppet 70 intersect the chamfer provided on the mating surface of seat 71 mating to form the volume which is common to the reservoir 12. The cap 63 is provided with a hex hole and is used to adjust spring load on the stack of spring washers 170.

Figure 14:
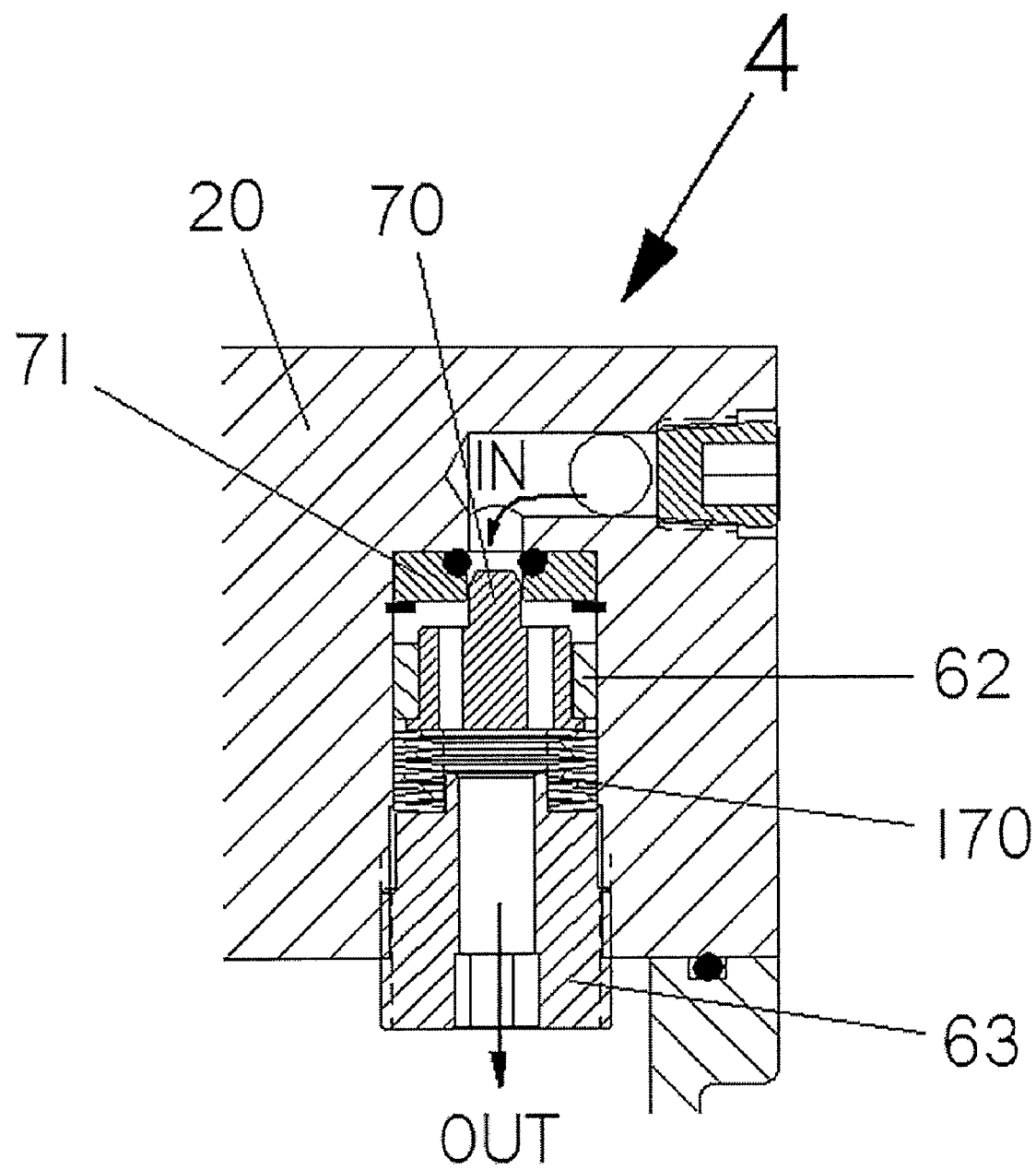
FIG. 14 is a cross section of the manifolded high pressure relief with system pressure.

Referring to FIG. 14 there is shown a cross section drawing of the high pressure relieve valve 4 in the pressurized open position. A hole drilled through the cap 63 discharges fluid into the reservoir.

Referring to FIG. 15 there is shown a cross section drawing of the regulated 2-way dump valve 9a which is assembled into the manifold 20 using six additional proprietary parts. In FIG. 15 it is shown in the "dumped" position. In the "dumped" position the lever 80 is vertical and against the standard washer 82. The standard washer 82 and sleeve 87 are preferably plastic to reduce friction forces. The one piece plunger 85 has a soft seal on its outside diameter located within an annular groove adjacent to a male conical surface 181. The sleeve 87 is threaded into manifold 20. In the "dumped" position the seal of plunger 85 is open and not contained in the bore of sleeve 87.

Figure 16:
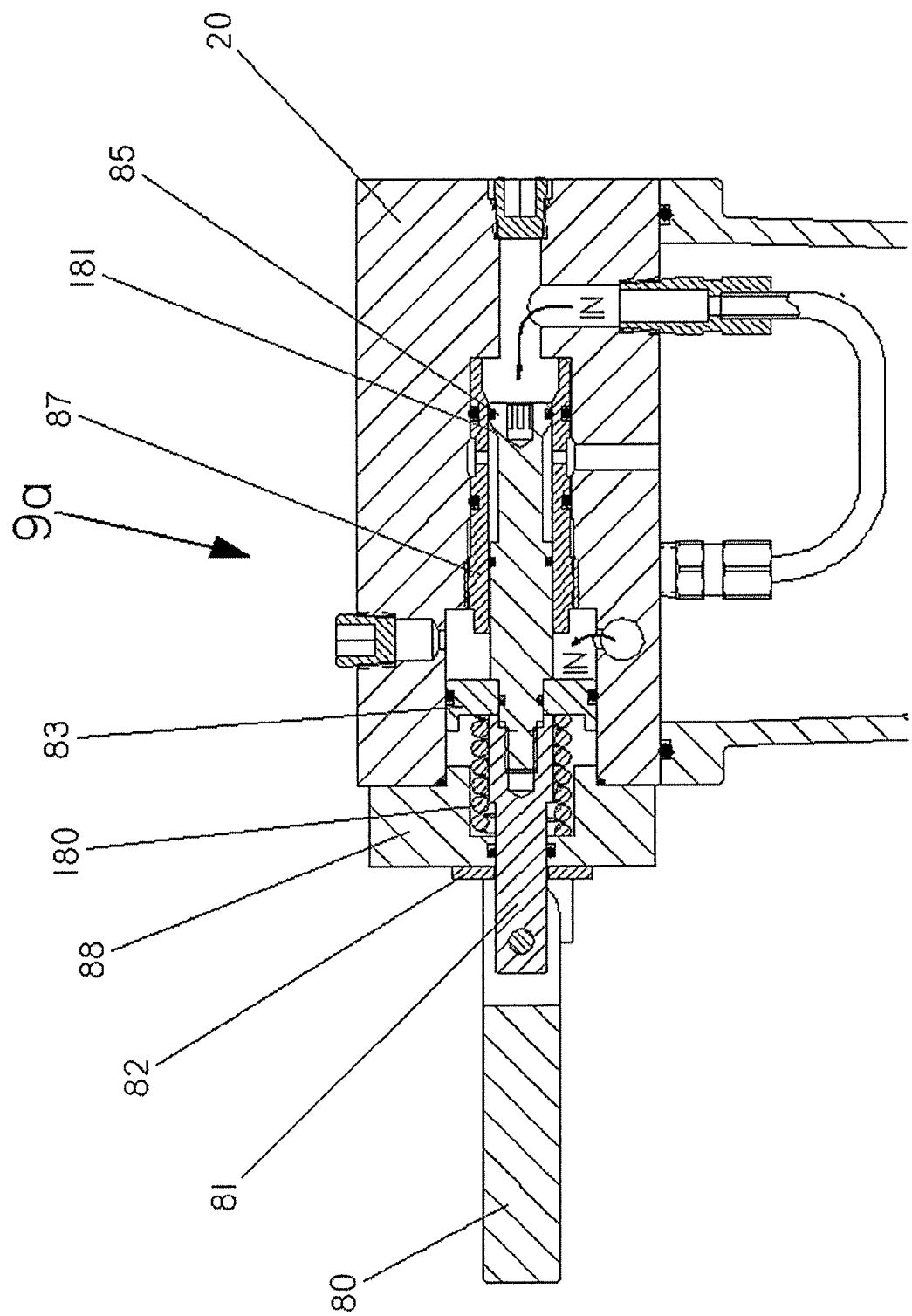
FIG. 16 is a cross section of the manifolded regulated 2-way dump valve in the leveled position.

Referring to FIG. 16 there is shown a cross section drawing of the regulated 2-way dump valve 9a which is assembled into the manifold 20 using six additional proprietary parts. In FIG. 16 it is shown in the "leveled" position. The lever 80 has a radial profile with a flat rectangular surface on the end which contacts the standard washer 82 as the lever 80 is rotated 90° to the level and horizontal position. The lever 80 pivots on a bolt installed through a clearance hole in the lift 81 and a mating hole in the lever 80. The said mating hole in the lever 80 is located off center relative to said radial profile. This said pin location effectively creates cam geometry. The plunger 85 threads into the lift 81 between which is clamped the piston 83. The said rotation of the lever 80 to the level position results in the lift 81, piston 83 and plunger 85 moving and compressing the single coil spring 180. The lever 80 is held in the level position by the spring compression and the flat rectangular surface. The soft seal on the male conical surface 181 of the plunger 85 gradually enters the bore of 87 as the lever 80 is moved to the "leveled" position.

Figure 17:
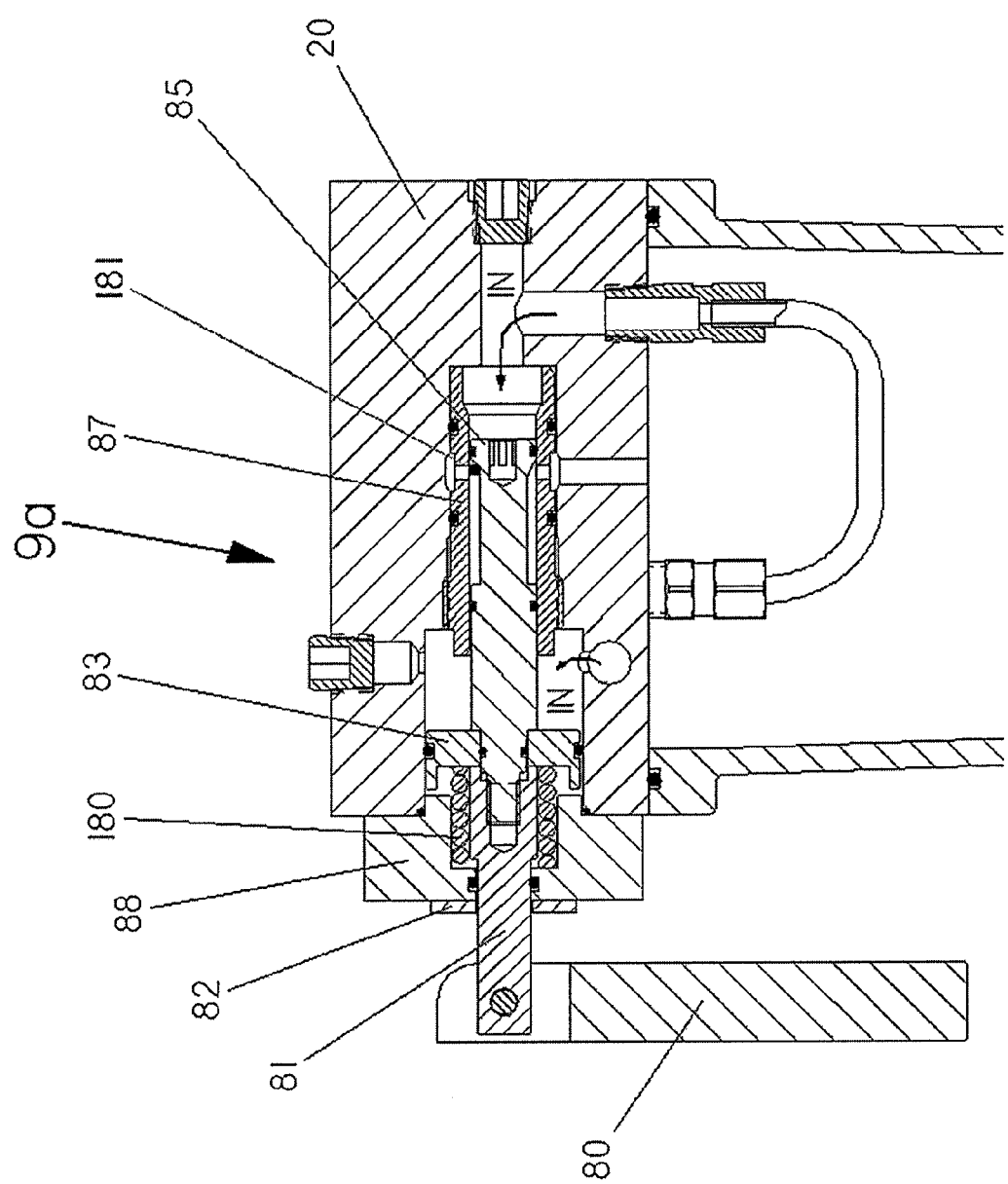
FIG. 17 is a cross section of the manifolded regulated 2-way dump valve in the charged position.

Referring to FIG. 17 there is shown a cross section drawing of the regulated 2-way dump valve 9a which is assembled into the manifold 20 using six additional proprietary parts. In FIG. 17 it is shown in the "charged" position. Application of the regulated signal pressure further compresses the single coil spring 180 and the soft seal on the male conical surface 181 of plunger 85 further enters the bore of sleeve 87. In the "charged" position the lever 80 has automatically pivoted and dropped from the level horizontal position to the vertical position.

The soft seal on the male conical surface 181 of plunger 85 is exposed to fluid velocity as it moves from the "charged" position in FIG. 17 to the "dumped" position in FIG. 15. During this transition the soft seal of plunger 85 leaves the sleeve 87 bore and the regulated pressure contained by the soft seal of plunger 85 is released into the reservoir 12. During this transition the male conical surface 181 immediately creates a widening annular flow passage reducing fluid velocity across said seal of plunger 85.

Figure 18:
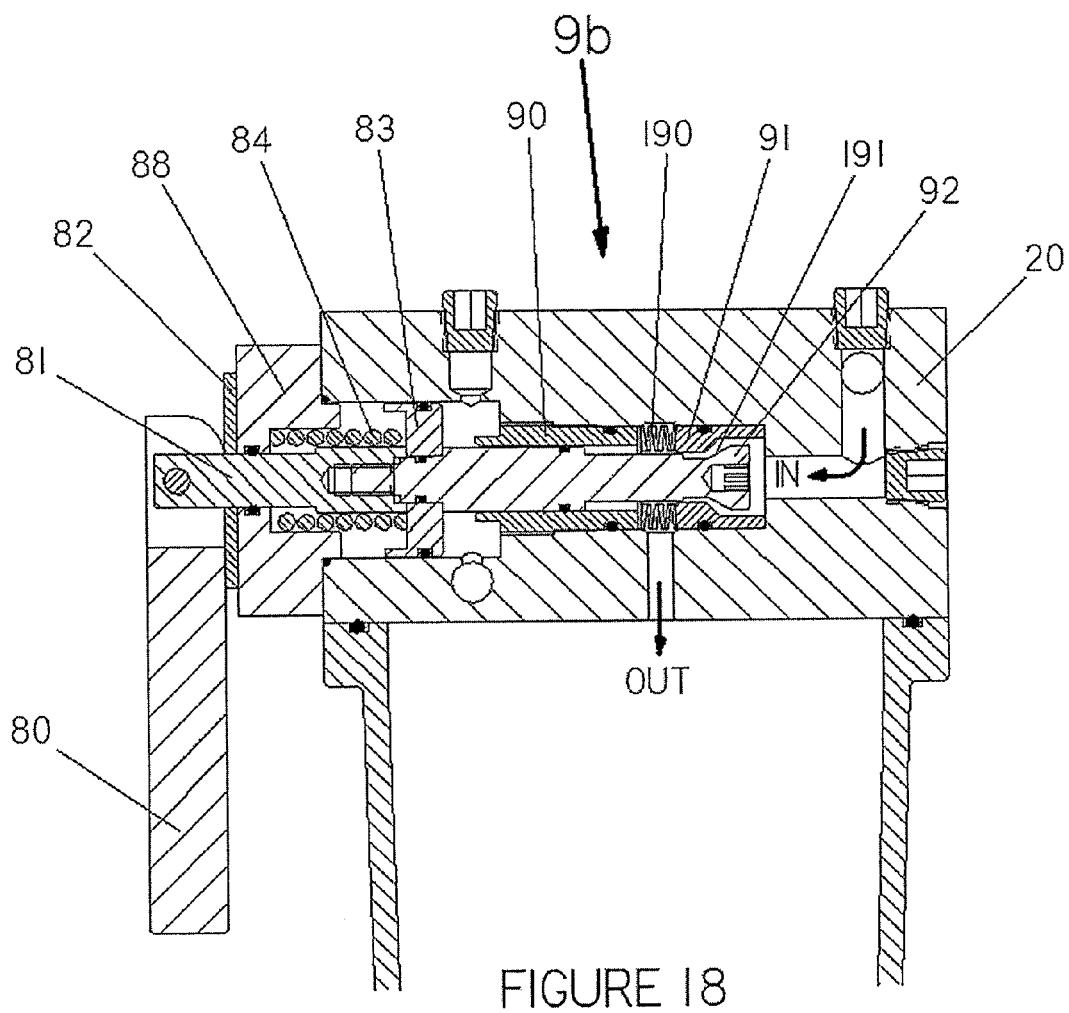
FIG. 18 is a cross section of the manifolded high pressure 2-way dump valve in the dumped position.

Referring to FIG. 18 there is shown a cross section drawing of the high pressure 2-way dump valve 9b which is assembled into the manifold 20 using seven additional proprietary parts. In FIG. 18 it is shown in the "dumped" position. In the "dumped" position the lever 80 is vertical and against the washer 82. The lever 80, lift 81, standard washer, cover 82 and piston 83 are common to the regulated 2-way dump valve 9a in FIG. 15. The spool 92 has a male conical seal surface 191. The sleeve 91, which is preferably plastic, is axially contained against a stack of spring washers by the plastic guide 90 which is threaded into the manifold 20. In the "dumped" position the male conical seal surface 191 of said spool 92 is open and does not contact the bore of sleeve 91. In the "dumped" position the spring washer stack 190 is slightly loose. The high pressure 2-way dump valve 9b in the "leveled" and "charged" positions function the same as the regulated 2-way dump valve 9a shown in FIG. 16 and FIG. 17. Manifold 20 can be assembled with either the regulated 2-way dump valve 9a shown in FIG. 15 or the high pressure 2-way dump valve 9b shown in FIG. 18.

Figure 19:
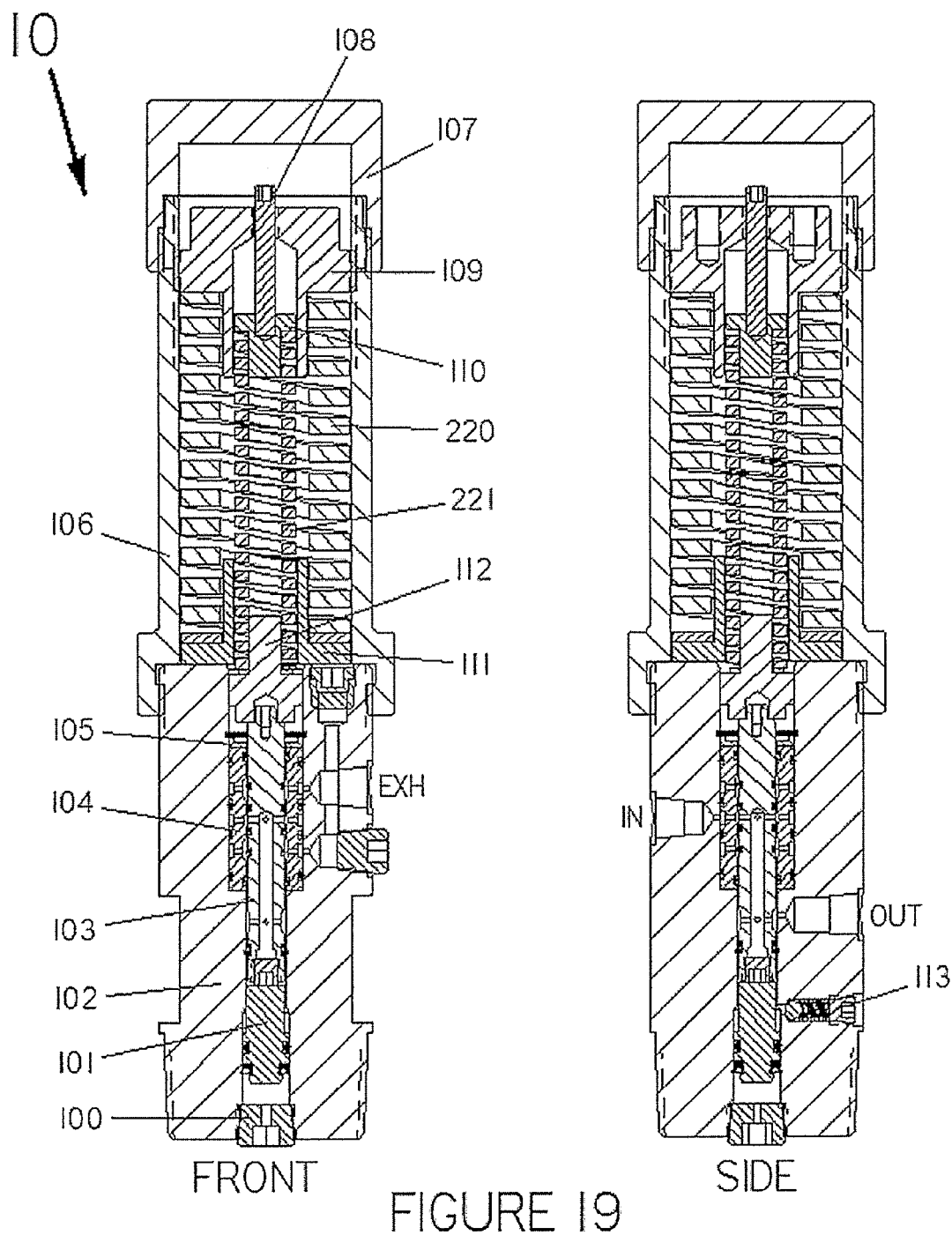
FIG. 19 is a cross section of the 3-way high and low pressure pilot with 0.562" sensing piston.

Referring to FIG. 19 there is shown a 3-way pressure pilot 10 with 0.562" diameter piston 101 which is assembled using fourteen proprietary parts. The sleeve 104, standard low spring washer and standard high spring washer are preferably plastic to reduce friction forces. The piston orifice 100 protects the piston 101 and piston seals. The low and high movement of piston 101 is fully constrained by the body 102 and piston orifice 100. The spool 103 which utilizes a socket hex pipe plug contacts the piston 101. The piston 101 moves up and down with pipeline pressure and thereby moves the spool 103 relative to the sleeve 104. The spool 103 is always in contact with the low spring saddle 112. The low spring saddle 112 is always in contact with the standard low spring washer and low spring 221. The sleeve 104 is fixed in the axial position within the body 102 by the spacer ring 105 and retaining ring.

The body 102 utilizes two hex socket pipe plugs to create the common exhaust volume. The spring canister 106 threads onto the body 102 to engage a mating shoulder. The high spring saddle 111 contacts the top body 102 surface unless high pressure has moved up piston 101, spool 103 and low spring saddle 112 further compressing the low spring and creating surface engagement between the low spring saddle 112 and high spring saddle 111. The resulting engagement also results in further compression of the high spring.

The low spring 221 and high spring 220 are located within the spring canister 106 and contact the low spring washer and high spring washer. The low spring plate 110 is located on top of the low spring 221. The spring nut 109 threads into the spring canister 106. The low spring screw 108 threads into the spring nut 109.

Spring adjustment is achieved by first adjusting the spring nut 109 and secondly adjusting the low spring screw 108. The spring nut 109 is provided with tapped holes to aid in adjustment and disassembly. The spring cap 107 threads onto the spring canister 106 to engage a mating shoulder. In a hole common to the volume formed between the piston 101 seals and spool 103 seals the body 102 utilizes a ball coil spring, ball and vent orifice 113. The said common volume will exhaust any excess pressure or seal leakage to atmosphere or to an exhaust line.

Figure 20:
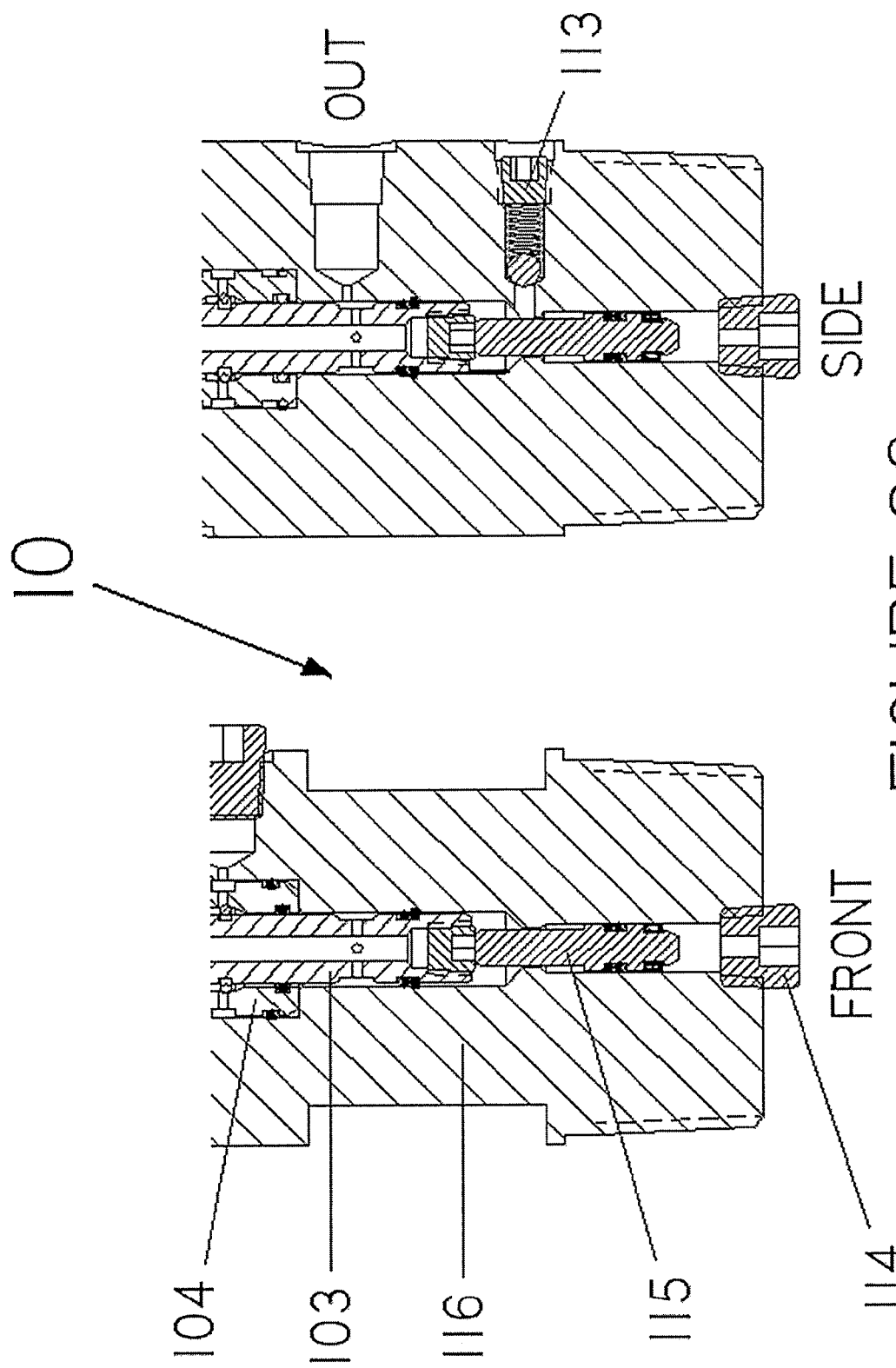
FIG. 20 is a cross section of the 3-way high and low pressure pilot with 0.312" sensing piston.

Referring to FIG. 20 there is shown another embodiment of 3-way pressure pilot 10 with a 0.312" diameter piston 115 which is assembled using seventeen proprietary parts. All proprietary parts are common to the 3-way pressure pilot 10 with 0.5 62" diameter piston 101 shown in FIG. 19 except for piston orifice 114, piston 115 and body 116.

Figure 21:
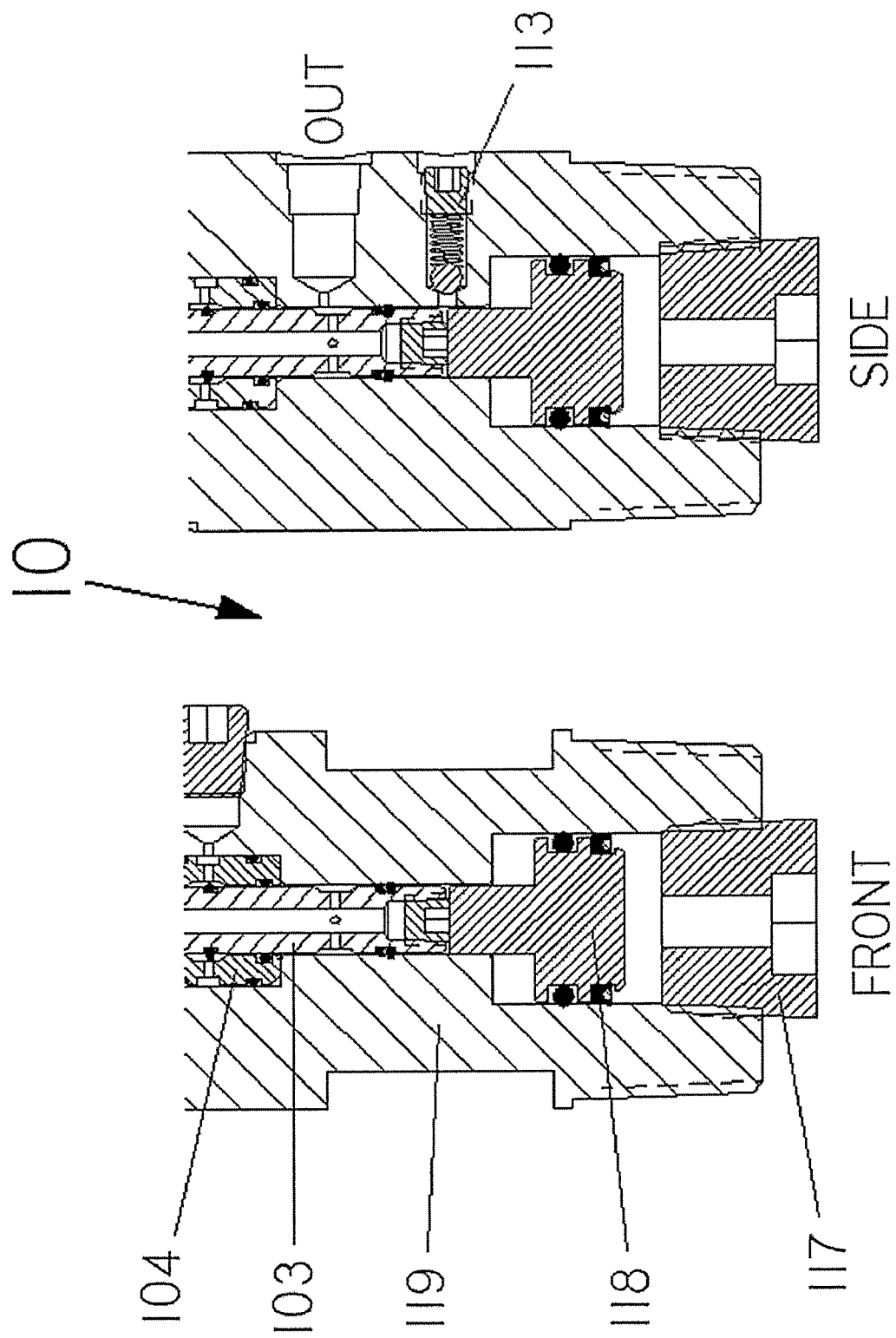
FIG. 21 is a cross section of the 3-way high and low pressure pilot with 1.125" sensing piston.

Referring to FIG. 21 there is shown another embodiment of 3-way pressure pilot 10 with a 1.125" diameter piston 118 which is assembled using seventeen proprietary parts. All proprietary parts are common to the 3-way pressure pilot 10 with 0.562" diameter piston 101 shown in FIG. 19 except for piston orifice 117, piston 118 and body 119.

Figure 22:
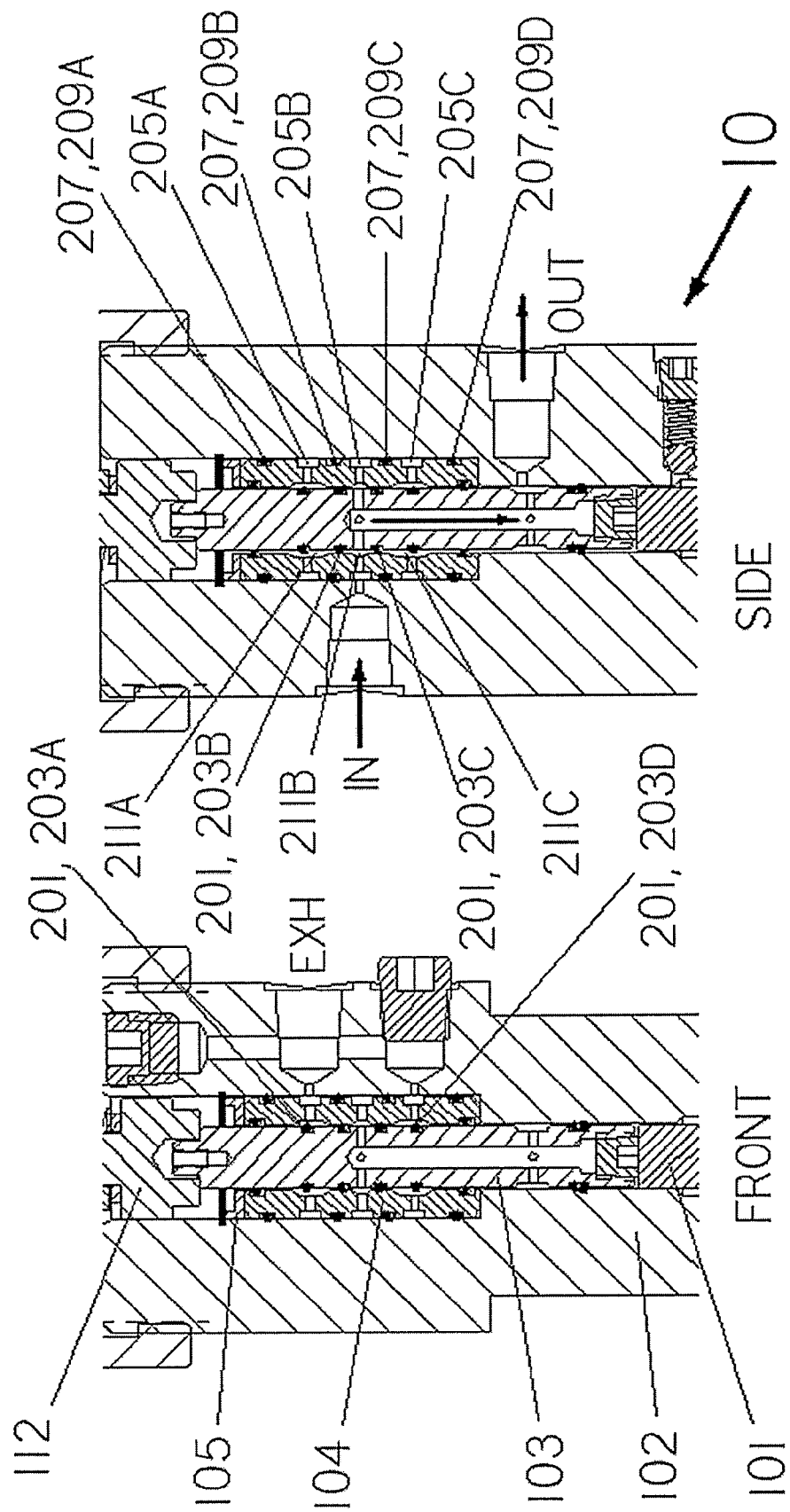
FIG. 22 is a cross section pressure pilot 3-way spool and sleeve near middle operating position.

Referring to FIG. 22 there is shown in detail the 3-way pressure pilot 10 with the spool 103 centered in the sleeve 104 with normal pipeline pressure. The spool 103 has four annular grooves 201 into which are installed four seals 203. The spool 103 is cross drilled to form a common volume between the two center spool seals 203B & C and the plugged end. The sleeve 104 has a series of three annular cavities 205 formed by four seal grooves 207 on the outside diameter into which are installed seals 209. These three annular cavities 205 on the outside diameter of sleeve 104 are conjoined with three annular seal grooves 211 on the inside diameter by cross drilled holes. With normal pipeline pressure the two outer seals 203A & D of spool 103 are positioned within annular cavities 211A and 211C respectively and common with the port labeled EXH. The body port labeled IN is common with the body port labeled OUT, and the port labeled EXH is closed. With low pressure the spool 103 moves down to the position shown in FIG. 23. With high pressure the spool 103 moves up to the position shown in FIG. 24.

Figure 23:
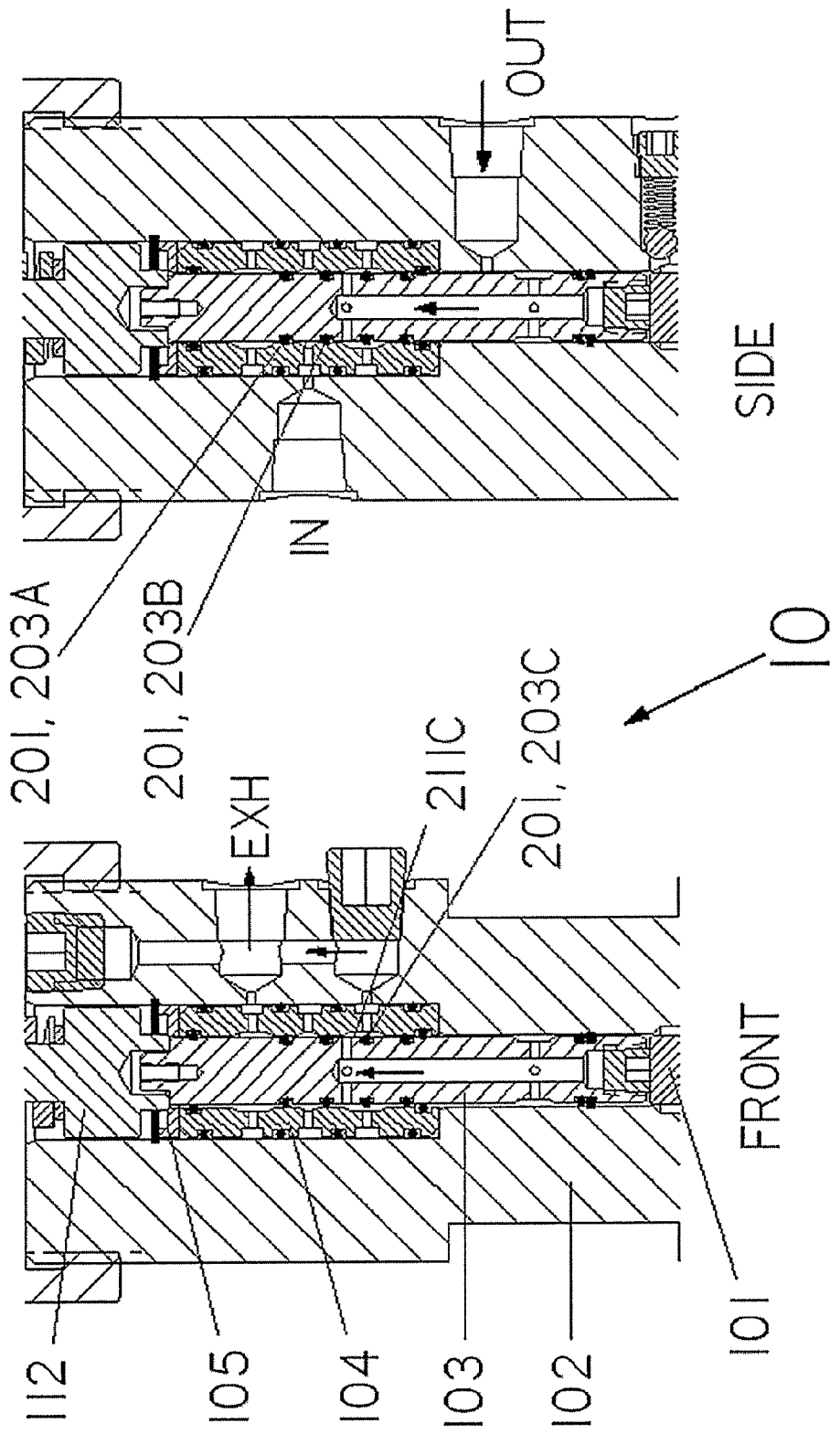
FIG. 23 is a cross section pressure pilot 3-way spool and sleeve at low sensed pressure position

Referring to FIG. 23 there is shown in detail the 3-way pressure pilot 10 with the spool 103 positioned in the sleeve 104 with low pipeline pressure. The seal 203C of spool 103 located second from the pipe plug end is positioned within annular cavity 211C. This spool seal 203C is common with the port labeled EXH. The body port labeled TN is closed by spool seals 203A and 203B. The body port labeled OUT is common with the port labeled EXH. When this spool seal 203C is moving to the position shown it leaves the bore of sleeve 104 to immediately enter annular cavity 211C formed with a 30 degree entry which reduces fluid velocity across it.

Referring to FIG. 24 there is shown in detail the 3-way pressure pilot 10 with the spool 103 positioned in the sleeve 104 with high pipeline pressure. The seal 203B of spool 103 located third from the pipe plug end is positioned within annular cavity 211A. This spool seal 203B is common with the port labeled EXH. The body port labeled IN is closed by spool seals 203C and 203D. The body port labeled OUT is common with the port labeled EXH. When this spool seal 203B is moving to the position shown it leaves the bore of sleeve 104 to immediately enter annular cavity 211A formed with a 30 degree entry which reduces fluid velocity across it.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A manifolded fail-safe hydraulic control system for controlling fail-safe operation of a pipeline valve, said system comprising:
   a pump;
   a pressure regulator;
   a low pressure volume accumulator;
   a low pressure relief valve;
   a high pressure relief valve;
   a piloted 2-way dump valve;
   a 3-way high and low pressure pilot;
   a reservoir; and
   a manifold;
   said manifold having a plurality of passageways capable of allowing liquid flow within said passageways;
   said pump, said low pressure volume accumulator, said pressure regulator, said low pressure relief valve, said high pressure relief valve and said piloted 2-way dump valve each being containable within one of said manifold and said reservoir and each being connectable to at least one said passageways;
   said pump, said low pressure volume accumulator, said pressure regulator, said low pressure relief valve, said high pressure relief valve, said piloted 2-way dump valve, said 3-way high and low pressure pilot, said manifold, and said reservoir being in circuit relationship to a pipeline pressure;
   said manifold capable of producing a pressure effective for controlling a spring return actuator in communication with a valve controlling the pipeline pressure.

2. A manifolded fail-safe hydraulic control system according to claim 1, an outer perimeter of said reservoir being fully containable within an outer perimeter of said manifold.

3. A manifolded fail-safe hydraulic control system according to claim 1, said pump is a hand pump further comprising a handle and a pump piston, said handle providing a plurality of indexed operating positions in a vertical plane of said hand pump, said pump piston being containable within said manifold and being connectable to said passageways in said manifold.

4. A manifolded fail-safe hydraulic control system according to claim 3, said pump further comprising a module having a check valve and pump discharge filter, said module being connectable to said manifold and providing access to said check valve and pump discharge filter without affecting containment of said pump piston in said manifold.

5. A manifolded fail-safe hydraulic control system according to claim 1, said pump is an oil immersed electric pump, said electric pump being containable within said reservoir.

6. A manifolded fail-safe hydraulic control system according to claim 1, said piloted 2-way dump valve further comprising a lift, a dump valve piston and a plunger, said lift and said plunger being connectable to one another to fasten said dump valve piston in between, said plunger oriented to cycle in a horizontal plane of said manifold.

7. A manifolded fail-safe hydraulic control system according to claim 6, said piloted 2-way dump valve further comprising a lever.

8. A manifolded fail-safe hydraulic control system according to claim 6, said piloted 2-way dump valve further comprising a high pressure dump valve sleeve.

9. A manifolded fail-safe hydraulic control system according to claim 8, said plunger being a high pressure plunger to engage said high pressure dump valve sleeve.

10. A manifolded fail-safe hydraulic control system according to claim 6, said piloted 2-way dump valve further comprising said dump valve sleeve being a low pressure sleeve and having a plurality of inner and outer annular cavities, said plurality of inner and outer annular cavities having cross-drilled radially spaced fluid flow passages.

11. A manifolded fail-safe hydraulic control system according to claim 10, said plunger being a low pressure plunger having a plurality of soft seals located on an outside diameter of said low pressure plunger, said plurality of soft seals spaced axially in relation to said radially spaced fluid flow passages.

12. A manifolded fail-safe hydraulic control system according to claim 1, said pressure regulator further comprising a regulator piston and a high pressure regulator poppet, said regulator piston oriented to cycle in a vertical plane of said manifold.

13. A manifolded fail-safe hydraulic control system according to claim 12, said high pressure regulator poppet oriented to provide a high pressure seat surface against said manifold.

14. A manifolded fail-safe hydraulic system according to claim 12, said regulator piston oriented to provide a mating surface against said manifold at zero pressure.

15. A manifolded fail-safe hydraulic control system according to claim 1, said low pressure volume accumulator further comprising an accumulator piston, said accumulator piston having an extended spring guide diameter and oriented to provide a mating surface against said manifold at high pressure.

16. A manifolded fail-safe hydraulic control system according to claim 15, said accumulator piston oriented to cycle in a horizontal plane of said manifold and further comprising at least one spiral groove across a face of said accumulator piston.

17. A manifolded fail-safe hydraulic system according to claim 15, said accumulator piston oriented to provide a mating surface against said accumulator cover at zero pressure.

18. A manifolded fail-safe hydraulic control system according to claim 1, said low pressure relief valve and said high pressure relief valve using an identical cap and each further comprising a valve poppet, a valve seat, and a valve poppet spring load, said valve poppet oriented to cycle in a vertical plane of said manifold.

19. A manifolded fail-safe hydraulic control system according to claim 18, said manifold is oriented to install said valve seat, said valve poppet and said valve poppet spring load into one common manifold bore.

20. A manifolded fail-safe hydraulic control system according to claim 18, said valve seat oriented to provide a soft seal between both said manifold and said poppet.

21. A manifolded fail-safe hydraulic control system according to claim 1 said 3-way high and low pressure pilot further comprising a pilot sleeve, said pilot sleeve fixed in a stationary position within a body of said 3-way high and low pressure pilot and having a plurality of inner and outer annular cavities, said plurality of inner and outer annular cavities having cross-drilled radially spaced fluid flow passages.

22. A manifolded fail-safe hydraulic control system according to claim 21, said pilot sleeve further comprising a pilot spool against which a monitored pipeline pressure acts, said pilot spool being movable within said pilot sleeve and having more than two outer soft seals, said outer soft seals specifically spaced axially in relation to said radially spaced fluid flow passages in said pilot sleeve.

* * * * *